(12) United States Patent
Falconetti et al.

(10) Patent No.: US 11,553,513 B2
(45) Date of Patent: Jan. 10, 2023

(54) METHODS AND APPARATUSES FOR DETERMINING A PLACEMENT AND DURATION OF A TRANSIENT PERIOD OF AN ON/OFF TIME MASK FOR UPLINK TRANSMISSION

(71) Applicant: Telefonaktiebolaget LM Ericsson (publ), Stockholm (SE)

(72) Inventors: Laetitia Falconetti, Järfälla (SE); Dominique Everaere, Åkersberga (SE); Jingya Li, Gothenburg (SE); Imadur Rahman, Sollentuna (SE); Mårten Sundberg, Årsta (SE); Gustav Wikström, Täby (SE); Hongxia Zhao, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 383 days.

(21) Appl. No.: 16/482,808

(22) PCT Filed: Feb. 2, 2018

(86) PCT No.: PCT/SE2018/050085
§ 371 (c)(1),
(2) Date: Aug. 1, 2019

(87) PCT Pub. No.: WO2018/143882
PCT Pub. Date: Aug. 9, 2018

(65) Prior Publication Data
US 2021/0282170 A1    Sep. 9, 2021

Related U.S. Application Data

(60) Provisional application No. 62/455,097, filed on Feb. 6, 2017.

(51) Int. Cl.
H04W 72/12    (2009.01)
H04L 5/00    (2006.01)
H04W 72/14    (2009.01)

(52) U.S. Cl.
CPC ....... *H04W 72/1289* (2013.01); *H04L 5/0048* (2013.01); *H04W 72/1278* (2013.01); *H04W 72/14* (2013.01)

(58) Field of Classification Search
CPC ......... H04W 72/1289; H04W 72/1278; H04W 72/14; H04L 5/0048; H04L 5/0082; H04L 5/0094; H04L 5/001
See application file for complete search history.

(56) References Cited

U.S. PATENT DOCUMENTS 10,827,427 B2 * 11/2020 Rahman ................ H04W 76/28

FOREIGN PATENT DOCUMENTS

EP    2 538 738 A1    12/2012
WO    2016 133123 A1    11/2017

OTHER PUBLICATIONS

Panasonic, "Transient period on NR uplink frame structure design", 3GPP TSG RAN WG1 Meeting #85 R1-164915, May 23-27, 2016 (Year: 2016).*

(Continued)

*Primary Examiner* — Justin T Van Roie
(74) *Attorney, Agent, or Firm* — Baker Botts, LLP

(57) ABSTRACT

A method in a wireless device is disclosed. The wireless device receives an uplink grant from a network node, the uplink grant scheduling one or more uplink transmissions by the wireless device. The wireless device selects an ON/OFF time mask to use for transmitting the one or more uplink transmissions. The wireless device determines, based on the received uplink grant, an allowed placement of a transient period of the selected ON/OFF time mask and a duration of (Continued)

the transient period to use for the one or more uplink transmissions.

16 Claims, 20 Drawing Sheets

(56) References Cited

OTHER PUBLICATIONS

3GPP TS 36.101 v10.24.1 (Release 10), pp. 13-100—Jan. 2017.
3GPP TSG-RAN WG1 #81; Reno, Nevada, USA; Title: Reply LS to RAN1 on implication of sTTI operation on UL On/Off time mask; Source: RAN4 (R4-1610953)—Nov. 14-18, 2016.
3GPP TSG-RAN WG4 Meeting #82; Athens, Greece; Source: Ericsson; Title: Further discussions on implication of On/Off mask on sill operations (R4-1701629)—Feb. 13-17, 2017.
PCT International Search Report for International application No. PCT/SE2018/050085—dated May 4, 2018.
PCT Written Opinion of the International Searching Authority for International application No. PCT/SE2018/050085—dated May 4, 2018.
Extended European Search Report issued for Application No./Patent No. 17895193.5-1205 / 3577966 PCT/SE2017051354—dated Nov. 9, 2020.
3GPP TSG RAN WG1 Meeting #86bis; Lisbon, Portugal; Source: CATT; Discussion on UL sTTI operation (R1-1608749)—Oct. 10-14, 2016.
3GPP TSG-RAN WG1 #86 bis; Lisbon, Portugal; Source: Ericsson; Title: UL power-related aspects for sTTI (R1-1610337)—Oct. 10-14, 2016.
3GPP TSG-RAN WG4 Meeting #83; Hangzhou, China; Source: Ericsson; Title: UE reporting supported transient time parameters (R4-1704841)—May 15-19, 2017.
3GPP TSG-RAN WG4 #81; Reno, Nevada, USA; Source: Ericsson; Title: Implication of sTTI operation on UL On/Off time mask (R4-1610472)—Nov. 14-18, 2016.
3GPP TSG-RAN WG4 Meeting #83; Berlin, Germany; Title: LS to RAN2 on UE reporting its supported transient time parameters (R4-1707653)—Aug. 21-25, 2017.
PCT International Search Report issued for International application No. PCT/SE2017/051354—dated May 2, 2018.
PCT Written Opinion of the International Searching Authority issued for International application No. PCT/SE2017/051354—dated May 2, 2018.
3GPP TSG-RAN WG4#82 Meeting; Athens, Greece; Source: ZTE Corporation; Title: Further discussion on UL On/Off time mask for shortened TTI (R4-1700445)—Feb. 13-17, 2017.
3GPP TSG RAN WG1 Meeting #86bis; Lisbon, Portugal; Source: Panasonic; Title: Discussion on reference signal design for shortened TTI (R1-1609572)—Oct. 10-14, 2016.
3rd Generation Partnership Project; Technical Specification Group Radio Access Network; Evolved Universal Terrestrial Radio Access (E-UTRA); User Equipment (UE) radio transmission and reception (Release 14), 3GPP TS 36.101 V14.1.0 (Sep. 2016), 1187 pages.

\* cited by examiner

METHODS AND APPARATUSES FOR DETERMINING A PLACEMENT AND DURATION OF A TRANSIENT PERIOD OF AN ON/OFF TIME MASK FOR UPLINK TRANSMISSION

PRIORITY

This nonprovisional application is a U.S. National Stage Filing under 35 U.S.C. § 371 of International Patent Application Serial No. PCT/SE2018/050085 filed Feb. 2, 2018 and entitled "Methods and Apparatus for Determining a Placement and Duration of a Transient Period of an On/Off Time Mask far Uplink Transmission" which claims priority to U.S. Provisional Patent Application No. 62/455,097 filed Feb. 6, 2017 both of which are hereby incorporated by reference in their entirety.

TECHNICAL FIELD

The present disclosure relates, in general, to wireless communications and, more particularly, to adaptive ON/OFF time mask and uplink reference signal position for short transmission time interval.

BACKGROUND

Long Term Evolution (LTE) uses Orthogonal Frequency Division Multiplexing (OFDM) in the downlink (DL) and Discrete Fourier Transform (DFT)-spread OFDM in the uplink (UL).

FIG. 1 illustrates an example of the LTE time-domain structure. In the time domain, LTE DL transmissions are organized into radio frames (such as radio frame 10) of 10 milliseconds (ms). Each radio frame 10 consists of ten equally-sized subframes of length $T_{subframe}=1$ ms, as shown in FIG. 1. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 μs.

The resource allocation in LTE is typically described in terms of resource blocks, where a resource block corresponds to one slot (0.5 ms) in the time domain and 12 contiguous subcarriers in the frequency domain. A pair of two adjacent resource blocks in the time direction (i.e., 1.0 ms) is known as a resource block pair. This is also denoted as Transmission Time Interval (TTI).

DL transmissions are dynamically scheduled (i.e., in each subframe the base station transmits control information about which terminals data is transmitted to and upon which resource blocks the data is transmitted, in the current DL subframe). This control signaling is typically transmitted in the first 1, 2, 3 or 4 OFDM symbols in each subframe and the number n=1, 2, 3 or 4 is known as the Control Format Indicator (CFI) indicated by the Physical CFI Channel (PCFICH) transmitted in the first symbol of the control region. The control region also contains Physical Downlink Control Channels (PDCCHs) and possibly also Physical Hybrid Automatic Repeat Request (HARQ) Indication Channels (PHICHs) carrying Acknowledgement (ACK)/Negative Acknowledgement (NACK) for the UL transmission.

The DL subframe also contains common reference symbols (CRS), which are known to the receiver and used for coherent demodulation of, for example, the control information.

FIG. 2 illustrates an example downlink subframe 20A. More particularly, FIG. 2 illustrates an example DL system with CFI=3 OFDM symbols as control. In an LTE Release 8 TTI, one such portion of the DL transmission is termed as one TTI.

Packet data latency is one of the performance metrics that vendors, operators and also end-users (e.g., via speed-test applications) regularly measure. Latency measurements are done in all phases of a Radio Access Network (RAN) system lifetime (e.g., when verifying a new software release or system component, when deploying a system, and when the system is in commercial operation).

Shorter latency than previous generations of $3^{rd}$ Generation Partnership Project (3GPP) Radio Access Technologies (RATs) was one performance metric that guided the design of LTE. LTE is now recognized by end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the Internet today. The typical size of HTTP-based transactions over the Internet are in the range of a few 10s of kilobytes up to 1 megabyte. In this size range, the TCP slow-start period is a significant part of the total transport period of the packet stream. During the TCP slow-start period, the performance is latency limited. Hence, improved latency can rather easily be shown to improve the average throughput for this type of TCP-based data transactions.

Radio resource efficiency could be positively impacted by latency reductions. Lower packet data latency could increase the number of transmissions that are possible within a certain delay bound. Hence, higher Block Error Rate (BLER) targets could be used for the data transmissions, freeing up radio resources and potentially improving the capacity of the system.

One area to address when it comes to packet latency reductions is the reduction of transport time of data and control signaling by addressing the length of a TTI. In LTE Release 8, a TTI corresponds to one subframe of length 1 ms. One such 1 ms TTI is constructed by using 14 OFDM or Single Carrier-Frequency Division Multiple Access (SC-FDMA) symbols in the case of normal cyclic prefix and 12 OFDM or SC-FDMA symbols in the case of extended cyclic prefix. In LTE Release 15, a work item with the goal of specifying transmissions with shorter TTIs that are much shorter than the LTE Release 8 TTI is on-going. Herein, shorter TTI is to be understood as shorter transmission duration. The shorter TTIs can be decided to have any duration in time and comprise resources on a number of OFDM or SC-FDMA symbols within a 1 ms subframe. As one example, the duration of the short TTI (sTTI) may be 0.5 ms (i.e., seven OFDM or SC-FDMA symbols for the case with normal cyclic prefix). As another example, the duration of the sTTI may be 2 symbols.

As seen in FIG. 2, the TTI length consists of 14 OFDM symbols. With shortened TTIs, the TTI length can be reduced to 2-OFDM symbols, 4-OFDM symbols, or 7-OFDM symbols. These are denoted as 2-OS sTTI, 4-OS sTTI, and 7-OS sTTI, respectively. As used herein, the OS can also be SC-FDMA or any type of symbol.

The shortened TTI can be used in different values in different direction, such as DL and UL. For example, a DL in a cell can use 2-OS sTTI, while an UL in the same cell can use 4-OS sTTI or 7-OS sTTI.

For different frame structures, such as FS1, FS2 and FS3, the sTTI that is used could be different too. The time domain structure described above in relation to FIG. 1 relates to FS1. For FS1, 2-OS, 4-OS, and 7-OS TTI can be used. For FS2 (which is used for Time Division Duplex (TDD)), 7-OS sTTI is one of the shortened TTI modes. Some example TTI durations are described below in relation to FIG. 3.

FIG. 3 illustrates examples of UL TTI options for 2-symbol short TTI in UL and flexible UL DMRS position. In the proposed UL sTTI layout for a 2-OS sTTI illustrated in FIG. 3, six examples (3-A through 3-F) are given for how a subframe 20B (containing 14 symbols, such as OFDM or SC-FDMA symbols, numbered 0-13 in the example of FIG. 3) can be divided into six sTTIs (including sTTI 0, sTTI 1, sTTI 2, sTTI 3, sTTI 4, and sTTI 5).

With example 2-OS sTTI configuration 3-A, subframe 20B is divided into 6 sTTIs (sTTI 0, sTTI 1, sTTI 2, sTTI 3, sTTI 4, and sTTI 5) consisting of two or three symbols each. In example 2-OS sTTI configuration 3-A, sTTI 0 includes symbols 0-2, sTTI 1 includes symbols 3-4, sTTI 2 includes symbols 5-6, sTTI 3 includes symbols 7-8, sTTI 4 includes symbols 9-10, and sTTI 5 includes symbols 11-13. As can be seen from example 2-OS sTTI configuration 3-A, none of sTTI 0-sTTI 5 overlap (i.e., do not share any symbols). In example 2-OS sTTI configuration 3-A, symbols 0, 3, 5, 7, 9, and 11 contain reference signals (denoted "R" in example 2-OS sTTI configuration 3-A), such as Demodulation Reference Signals (DMRS), and symbol 13 contains a Sounding Reference Signal (denoted "S" in example 2-OS sTTI configuration 3-A).

Example 2-OS sTTI configurations 3-B through 3-F illustrate other possible configurations for 2-OS sTTI in the UL. As can be seen from the various example configurations of FIG. 3, the length of the sTTIs (in terms of number of symbols) can vary, as can the position of the reference signals (e.g., DMRSs). Additionally, in some cases (e.g., example 2-OS configurations 3-E and 3-F) two sTTIs may overlap (i.e., share symbols). For instance, in example 2-OS configuration 3-F sTTI 0 and sTTI 1 both include symbol 3).

A symbol (e.g., OFDM or SC-FDMA) with reference signals (e.g., DMRS) is needed for demodulation of a 2-OS sTTI. If a DMRS symbol is included in every 2-OS sTTI, the DMRS overhead would be 50%. To reduce the UL DMRS overhead, a flexible DMRS position needs to be supported for 2-OS sTTI. As illustrated in FIG. 3, the DMRS used for demodulating a sTTI can be contained within this sTTI or be outside of the sTTI boundaries. In example 2-OS sTTI configuration 3-D, for instance, sTTI 1 and sTTI 2 do not contain DMRS. In such a scenario, demodulation of sTTI 1 and sTTI 2 is based on the DMRS sent in sTTI 0. An indication of the UL DMRS is done in the UL grant of a UL sTTI.

As stated in 3GPP TS 36.101, v14.1.0, Section 6.3.4, "[t]he General ON/OFF time mask defines the observation period between Transmit OFF and ON power and between Transmit ON and OFF power. ON/OFF scenarios include; the beginning or end of DTX, measurement gap, contiguous, and non-contiguous transmission. The OFF power measurement period is defined in a duration of at least one sub-frame excluding any transient periods. The ON power is defined as the mean power over one sub-frame excluding any transient period. There are no additional requirements on UE transmit power beyond that which is required in subclause 6.2.2 and subclause 6.6.2.3.

FIG. 4 illustrates an example of the general ON/OFF time mask. More particularly, FIG. 4 is reproduced from 3GPP TS 36.101, v14.1.0, FIG. 6.3.4.1-1. The ON/OFF time mask of FIG. 4 is designed for 1 ms TTI in Release 8 legacy LTE systems. The duration of ramping of power (e.g., the ramping up of power during the 20 μs transient period from the end of OFF power requirement to the start of ON power or the ramping down of power during the 20 μs transient period from the end of ON power to the start of OFF power requirement) in the mask is shorter compared to the length of subframe or slot, but its position has an influence on system performance. In terms of ramping up/down or transient position, a few non-limiting possibilities include: ramping outside timeslot/subframe; ramping inside time slot/subframe; and ramping partly inside and outside timeslot/subframe. Examples of these approaches to ramping up/down are illustrated in FIG. 5 described below.

FIG. 5 illustrates examples of the different possibilities for location of the power ramps. More particularly, FIG. 5 illustrates three examples 5-A, 5-B, and 5-C of ramping up and down of power in different possible locations in time in the mask. In example 5-A, ramping up and down of power takes place outside subframe 20C. In example 5-B, ramping up and down of power takes place inside subframe 20D. In example 5-C, ramping up and down of power takes place partially inside and partially outside subframe 20E.

As can be seen from the above-described example of FIG. 4, a typical value for the transient period in Release 8 LTE is 20 μs. In the current specifications, the transient period for ON/OFF mask with 1 ms TTI duration is defined as 20 μs, which is quite small compared to 1 ms TTI duration. A similar maximum duration is currently considered for the transient period for LTE short TTI. Thus, the transient period will represent a larger portion of the UL transmission with 2-OS short TTI. A shorter TTI length (as short as 2-OS sTTI compared to 14-OS (i.e., 1 ms)) may mean that the transient period can become quite significant compared to TTI duration. For example, for 2-OS TTI duration a 20 μs transient period will be roughly $1/7^{th}$ of the TTI duration, which will reduce the system performance significantly.

Several ON/OFF masks will be defined for short TTI to cover various transmission cases (e.g., the case of consecutive sTTI transmission with or without power change or the case of SRS transmission). A non-exhaustive list is given in R4-1610953, "Reply LS to RAN1 on implication of sTTI operation on UL ON/OFF time mask," 3GPP TSG-RAN WG1 #81, Reno, Nev., USA 14-18 Nov. 2016. Examples are described below in relation to FIGS. 6 and 7 when a wireless device is scheduled across 2 consecutive TTIs. In the examples of FIGS. 6 and 7, the considered value for the middle transient period is up to 40 us.

FIG. 6 illustrates a possible ON/OFF mask for consecutive TTIs when there are power changes between consecutive TTIs with ramp up/down in between consecutive TTIs. More particularly, FIG. 6 illustrates two TTIs 605A and 605B, as well as three transient periods: first transient period 610, middle transient period 615, and second transient period 620. In the example of FIG. 6, during first transient period 610 the power level ramps up from OFF level 625 to ON level 630 outside of TTI 605A, while during second transient period 620 the power level ramps down from ON level 630 to OFF level 625 outside of TTI 605B. In the example of FIG. 6, power changes (e.g., ramp up/down) between consecutive TTIs 605A and 605B take place between TTIs 605A and 605B during middle transient period 615. In the example of FIG. 6, power changes take place in both TTI 605A and 605B during middle transient period 615.

FIG. 7 illustrates a second possible ON/OFF mask for consecutive TTIs when there are power changes between consecutive TTIs with ramp up/down in between consecutive TTIs. More particularly, FIG. 7 illustrates two TTIs 705A and 705B, as well as three transient periods: first transient period 710, middle transient period 715, and second transient period 720. In the example of FIG. 7, during first transient period 710 the power level ramps up from OFF level 725 to ON level 730 within TTI 705A, while during second transient period 720 the power level ramps down from ON level 630 to OFF level 625 outside of TTI 705B. In the example of FIG. 7, power changes (e.g., ramp up/down) between consecutive TTIs 705A and 705B take place within TTI 705B during middle transient period 715.

As described above, in the current specifications, the ON/OFF time mask is defined for 1 ms TTI duration. The transient period is defined as 20 µs, which is quite small compared to 1 ms TTI duration. However, the shorter TTI length (as short as 2-OS compared to 14-OS or 1 ms) may mean that the transient period can become quite significant compared to TTI duration. The problem may become very significant, for example, when a wireless device is allocated in two consecutive TTIs. In that case, the legacy mask may cause a large part of the TTI duration to be lost. Moreover, legacy masks do not handle the case where the reference signal (e.g., DMRS) does not have a fixed position. As described above in relation to FIG. 3, with 2-OS short TTI the reference signal position is flexible and can be placed within or outside the sTTI boundaries. Consequently, there is a need for an improved approach to how a wireless device selects the correct ON/OFF mask.

SUMMARY

According to one example embodiment, a method in a wireless device is disclosed. The method comprises receiving an uplink grant from a network node, the uplink grant scheduling one or more uplink transmissions by the wireless device. The method comprises selecting an ON/OFF time mask to use for transmitting the one or more uplink transmissions. The method comprises determining, based on the received uplink grant, an allowed placement of a transient period of the selected ON/OFF time mask and a duration of the transient period to use for the one or more uplink transmissions.

In certain embodiments, the method may comprise performing the scheduled one or more uplink transmissions using the selected ON/OFF time mask. In certain embodiments, the one or more uplink transmissions may be scheduled using short transmission time intervals.

In certain embodiments, determining the allowed placement and the duration of the transient period may be based on one or more of: one or more pre-defined rules; a modulation to be used for the one or more uplink transmissions; a coding rate to be used for the one or more uplink transmissions; a modulation and coding scheme to be used for the one or more uplink transmissions; a power level of one or more sTTIs; a power level of one or more symbols; a position of a reference symbol in the one or more uplink transmissions; whether the one or more uplink transmissions share reference symbols; and a number of consecutively scheduled uplink transmission using sTTIs.

In certain embodiments, the transient period of the selected ON/OFF time mask may overlap with one or more of: a reference symbol of at least one of the scheduled one or more uplink transmissions; and a data symbol of at least one of the scheduled one or more uplink transmissions.

In certain embodiments, the scheduled one or more uplink transmissions may comprise at least one uplink transmission preceding or following a scheduled sounding reference signal (SRS) transmission, and the transient period of the selected ON/OFF time mask does not overlap with the scheduled SRS transmission.

In certain embodiments, the scheduled one or more uplink transmissions may comprise at least one data uplink transmission preceding or following a scheduled control channel transmission, and the method may comprise determining a position of at least one of: a reference symbol of the at least one data uplink transmission relative to the scheduled control channel transmission in time; a data symbol of the at least one data uplink transmission relative to the scheduled control channel transmission in time; a reference symbol of the scheduled control channel transmission; and a data symbol of the scheduled control channel transmission. In certain embodiments, the transient period of the selected ON/OFF time mask may overlap with the reference symbol of the at least one data uplink transmission if the reference symbol is next to the scheduled control channel transmission in time. In certain embodiments, the transient period of the selected ON/OFF time mask may overlap with both the data symbol of the at least one data uplink transmission and the scheduled control channel transmission if the data symbol of the at least data uplink transmission is next to the scheduled control channel transmission in time. In certain embodiments, the transient period of the selected ON/OFF time mask may overlap with both the reference symbol of the at least one data uplink transmission and the reference symbol of the scheduled control channel transmission if both reference symbols are placed consecutively. In certain embodiments, the transient period of the selected ON/OFF time mask may overlap both the data symbol of the at least one data uplink transmission and the data symbol of the scheduled control channel transmission if both the reference symbol of the at least one data uplink transmission and the reference symbol of the scheduled control channel transmission are placed consecutively.

In certain embodiments, the scheduled one or more uplink transmissions may comprise two or more uplink transmissions, and the transient period of the selected ON/OFF time mask may overlap with a reference symbol of at least one of the two or more uplink transmissions if the two or more uplink transmissions have separate reference symbol positions.

In certain embodiments, the scheduled one or more uplink transmissions may comprise two or more uplink transmissions, and the transient period of the selected ON/OFF time mask may overlap with a data symbol of at least one of the two or more uplink transmissions if the two or more uplink transmissions share reference symbol positions.

In certain embodiments, the scheduled one or more uplink transmissions may comprise two or more uplink transmissions, and the transient period of the selected ON/OFF time mask may overlap with a reference symbol of a first uplink transmission of the two or more uplink transmissions and a data symbol of a second uplink transmission of the two or more uplink transmissions.

In certain embodiments, selecting the ON/OFF time mask to use for transmitting the one or more uplink transmissions may comprise selecting an ON/OFF time mask in which the transient period does not overlap with any symbols of the scheduled one or more uplink transmissions.

Also disclosed is a wireless device. The wireless device comprises a receiver, a transmitter, and processing circuitry coupled to the receiver and the transmitter. The processing circuitry is configured to receive, via the receiver, an uplink grant from a network node, the uplink grant scheduling one or more uplink transmissions by the wireless device. The processing circuitry is configured to select an ON/OFF time mask to use for transmitting the one or more uplink transmissions. The processing circuitry is configured to determine, based on the received uplink grant, an allowed placement of a transient period of the selected ON/OFF time mask and a duration of the transient period to use for the one or more uplink transmissions.

Also disclosed is a wireless device. The wireless device comprises a receiving module and a determining module coupled to the receiving module. The receiving module is configured to receive an uplink grant from a network node, the uplink grant scheduling one or more uplink transmissions by the wireless device. The determining module is configured to select an ON/OFF time mask to use for transmitting the one or more uplink transmissions. The determining module is configured to determine, based on the received uplink grant, an allowed placement of a transient period of the selected ON/OFF time mask and a duration of the transient period to use for the one or more uplink transmissions.

Also disclosed is a computer program, the computer program comprising instructions configured to perform the above-described method in a wireless device. Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a wireless device.

Also disclosed is a method in a network node. The method comprises determining a position of a reference symbol in one or more uplink transmissions to be scheduled for a wireless device. The method comprises sending an uplink grant to the wireless device for scheduling the one or more uplink transmissions, the uplink grant indicating the determined position of the reference symbol in the one or more uplink transmissions.

In certain embodiments, determining the position of the reference symbol in the one or more uplink transmissions to be scheduled for the wireless device may be based on one or more of: a position of a Sounding Reference Signal (SRS) transmission relative to the one or more uplink transmissions; a number of consecutively scheduled data uplink transmissions for the wireless device; an uplink power in the one or more uplink transmissions; a modulation and coding scheme (MCS) used for the one or more uplink transmissions; a modulation rate of the one or more uplink transmissions; a coding rate of the one or more uplink transmissions; and one or more characteristics of the reference symbol.

In certain embodiments, at least one of the one or more uplink transmissions may be preceded by an SRS transmission and scheduled with a MCS that is below a threshold, and determining the position of the reference symbol may comprise selecting a position of the reference symbol in the at least one uplink transmission that will at least partially overlap with a transient period of an ON/OFF time mask that the wireless device will use to perform the at least one uplink transmission.

In certain embodiments, at least one of the one or more uplink transmissions may be preceded by an SRS transmission and scheduled with a MCS scheme that is above a threshold, and determining the position of the reference symbol may comprise selecting a position of the reference symbol in the at least one uplink transmission that will not overlap with a transient period of an ON/OFF time mask that the wireless device will use to perform the at least one uplink transmission.

In certain embodiments, at least one of the one or more uplink transmissions may comprise an SRS transmission, and determining the position of the reference symbol may comprise selecting a position of the reference symbol that will not be within a transmission time interval (TTI) used for transmitting the at least one uplink transmission comprising the SRS transmission. In certain embodiments, the selected position of the reference symbol is in another uplink transmission preceding the at least one uplink transmission comprising the SRS transmission.

In certain embodiments, the uplink grant to the wireless device may schedule consecutive uplink transmissions, the consecutive uplink transmissions comprising at least a first uplink transmission and a second uplink transmission that share the reference symbol, and determining the position of the reference symbol may be further based on whether there is a change in transmit power by the wireless device between the first uplink transmission and the second uplink transmission.

In certain embodiments, the uplink grant to the wireless device schedules a plurality of uplink transmissions that do not share the reference symbol, and determining the position of the reference symbol may comprise selecting, for each of the plurality of uplink transmissions, a position of a reference symbol in each respective uplink transmission that at least partially overlaps with a transient period of an ON/OFF time mask that the wireless device will use to perform each respective uplink transmission. In certain embodiments, determining the position of the reference symbol may be further based on whether there is a change in transmit power by the wireless device between the plurality of uplink transmissions.

In certain embodiments, the one or more uplink transmissions to be scheduled for the wireless device may comprise one or more uplink transmissions to be scheduled for the wireless device using short TTIs.

Also disclosed is a network node. The network node comprises a transmitter and processing circuitry coupled to the transmitter. The processing circuitry is configured to determine a position of a reference symbol in one or more uplink transmissions to be scheduled for a wireless device. The processing circuitry is configured to send, via the transmitter, an uplink grant to the wireless device for scheduling the one or more uplink transmissions, the uplink grant indicating the determined position of the reference symbol in the one or more uplink transmissions.

Also disclosed is a network node. The network node comprises a communication module and a determining module coupled to the communication module. The determining module is configured to determine a position of a reference symbol in one or more uplink transmissions to be scheduled for a wireless device. The communication module is configured to send an uplink grant to the wireless device for scheduling the one or more uplink transmissions, the uplink grant indicating the determined position of the reference symbol in the one or more uplink transmissions.

Also disclosed is a computer program, the computer program comprising instructions configured to perform the above-described method in a network node. Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a network node.

Certain embodiments of the present disclosure may provide one or more technical advantages. For example, in certain embodiments the wireless device behavior with respect to the ON/OFF time mask may advantageously be well-defined for different TTI patterns. As another example, the wireless device behavior with respect to the ON/OFF time mask may be advantageously optimized to achieve high throughput, for example, when: non-consecutive TTI patterns are used; when different TTI patterns are used in consecutive TTIs and the wireless device is allocated resources in these consecutive TTI; and/or when different TTI patterns are used in consecutive TTIs and the wireless device is allocated overlapping resources in these consecutive TTIs. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
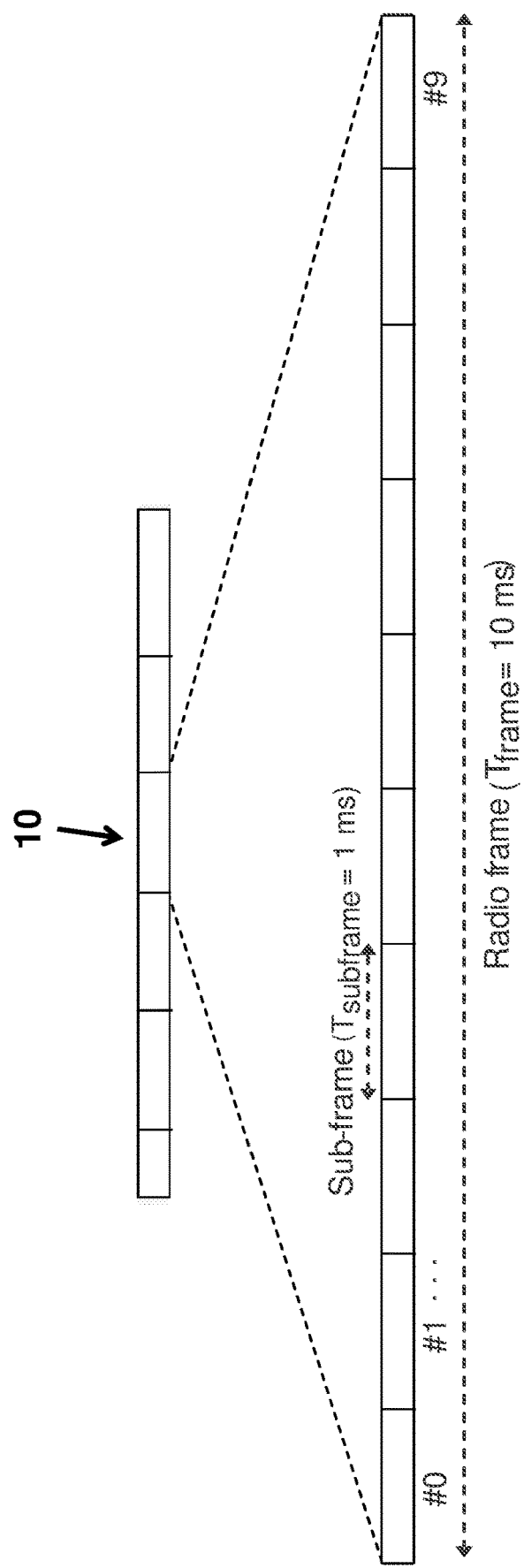
FIG. 1 illustrates an example of the LTE time-domain structure.
Figure 2:
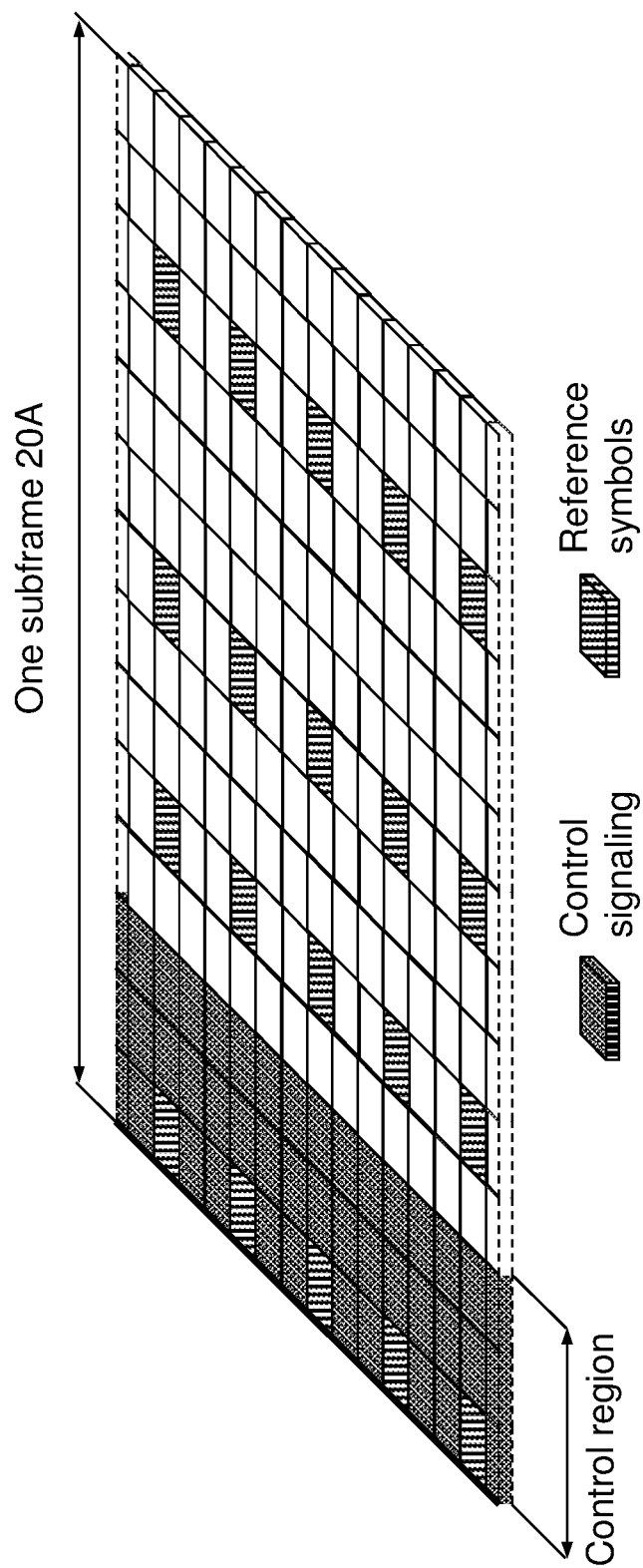
FIG. 2 illustrates an example downlink subframe.
Figure 3:
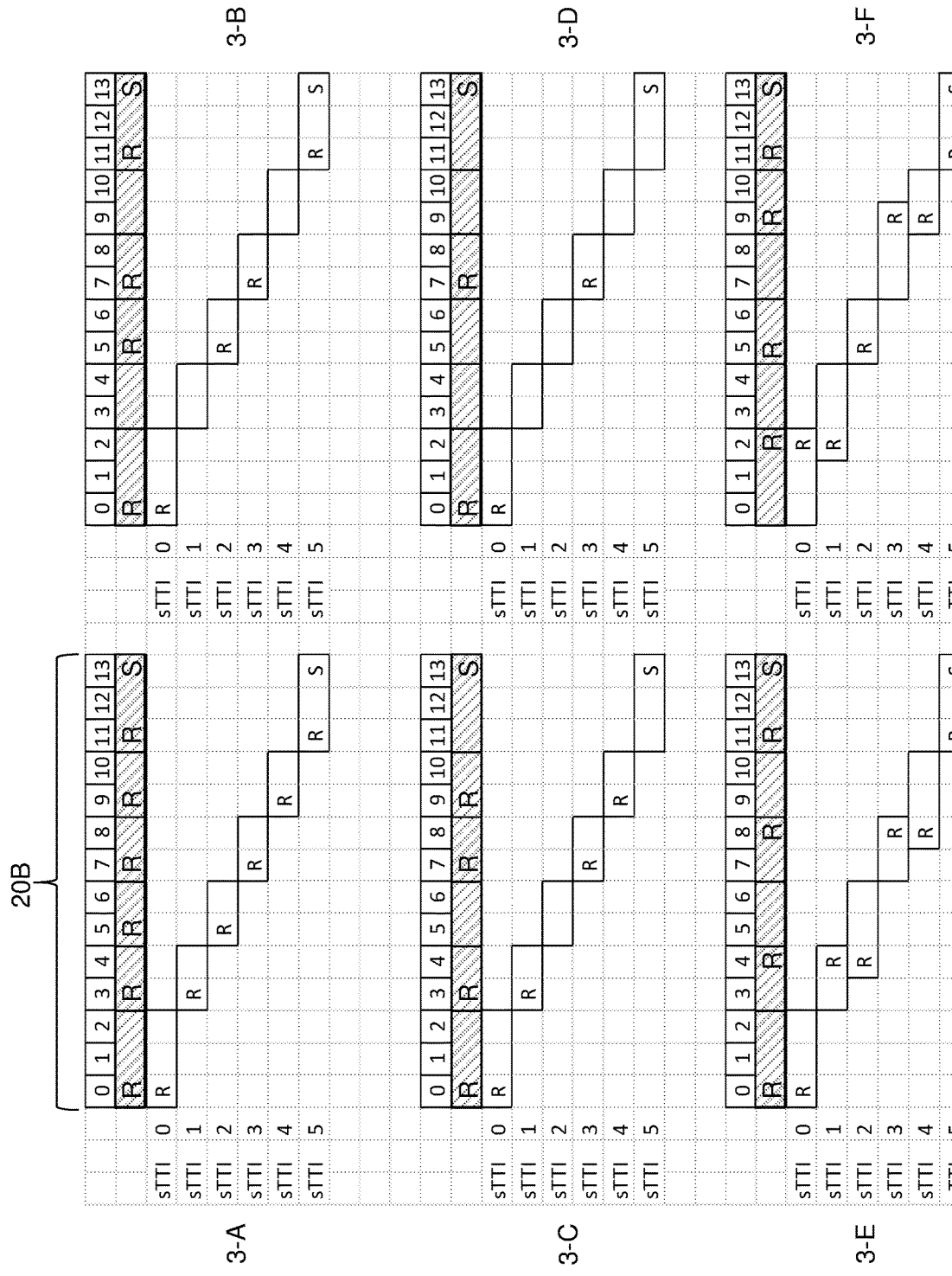
FIG. 3 illustrates examples of UL TTI options for 2-symbol short TTI in UL and flexible UL DMRS position.

As described above, in the current specifications, the ON/OFF time mask is defined for 1 ms TTI duration. The transient period is defined as 20 µs, which is quite small compared to 1 ms TTI duration. However, the shorter TTI length (as short as 2-OS compared to 14-OS or 1 ms) may mean that the transient period can become quite significant compared to TTI duration. The problem may become very significant, for example, when a wireless device is allocated in two consecutive TTIs. In such a case, the legacy mask may cause a large part of the TTI duration to be lost. Moreover, legacy masks do not handle the case where the reference signal (e.g., DMRS) does not have a fixed position. As described above in relation to FIG. 3, with 2-OS short TTI the reference signal position is flexible and can be placed within or outside the sTTI boundaries. Consequently, there is a need for an improved approach to how a wireless device selects the correct ON/OFF mask.

The present disclosure contemplates various embodiments that may address these and other deficiencies associated with existing approaches. In some cases, this is achieved through a method of ON/OFF mask selection based on scheduling information that, for example, indicates the position of the UL reference signal (e.g., DMRS). According to one example embodiment, a method in a wireless device (e.g., a user equipment (UE)) is disclosed. The wireless device receives an UL grant from a network node (e.g., evolved NodeB (eNB) or gNodeB (gNB)), the UL grant scheduling one or more UL transmissions by the wireless device. The wireless device selects an ON/OFF time mask to use for transmitting the one or more UL transmissions. The wireless device determines, based on the received UL grant, an allowed placement of a transient period of the selected ON/OFF time mask and a duration of the transient period to use for the one or more UL transmissions.

In certain embodiments, the wireless device may select the ON/OFF time mask and allowed placement and duration of the transient period based on scheduling information received by the wireless device from the network node. This scheduling information can be related to an imminent, a preceding, or a future UL transmission. It can also be related to an UL data channel transmission, an UL control channel transmission, or an UL reference signal transmission. For instance, the wireless device may place the transient period differently if a SRS is to be transmitted just before an UL data short TTI. In some cases, the wireless device may place the transient period differently if an UL control channel on short TTI (e.g., short Physical Uplink Control Channel (sPUCCH)) is to be transmitted just after an UL data short TTI. As another example, the wireless device may place the transient period differently if several UL data transmissions on short TTI are scheduled consecutively.

In certain embodiments, the wireless device may determine, based on the received UL grant, an allowed placement and duration so that the transient period overlaps with one or more of: a reference symbol of at least one of the scheduled UL transmissions; a data symbol of at least one of the scheduled UL transmission; a combination of data symbol and reference symbol from two of the scheduled UL transmissions if more than one were scheduled for the wireless device; and none of the symbols of the scheduled UL transmissions (i.e. the transient period is located before and after the scheduled UL transmissions). In certain embodiments, the one or more UL transmissions may be scheduled using short TTIs.

In certain embodiments, the determination to place the transient period over the reference symbol (e.g., DMRS symbol) or data symbol may be based on one or more of: one or more pre-defined rules; a modulation to be used for the one or more uplink transmissions; a coding rate to be used for the one or more uplink transmissions; a modulation and coding scheme to be used for the one or more uplink transmissions; a power level of one or more sTTIs; a power level of one or more symbols; a position of a reference symbol in the one or more uplink transmissions; whether the one or more uplink transmissions share reference symbols; and a number of consecutively scheduled uplink transmission using sTTIs. In certain embodiments, the wireless device can extract this information from the received UL grant or scheduling information.

In certain embodiments, several ON/OFF masks may be pre-defined or pre-configured for a given situation. For instance, the examples illustrated in FIGS. 6 and 7 described above could be ON/OFF masks allowed for the case that consecutive TTIs are scheduled to a wireless device. In such a scenario, the method defines how the wireless device selects one of the pre-defined ON/OFF masks at a given time.

According to another example embodiment, a method in a network node (e.g., eNB or gNB) for scheduling based on one or more pre-defined ON/OFF masks at a wireless device (e.g., UE) is disclosed. The network node determines a position of a reference symbol in one or more UL transmissions to be scheduled for a wireless device. The network node sends an UL grant to the wireless device for scheduling the one or more UL transmissions. The UL grant indicates the determined position of the reference symbol in the one or more UL transmissions.

In certain embodiments, the placement of the reference symbol (e.g., DMRS symbol) is chosen by the network to ensure that: either the reference symbol(s) are not impacted by the transient period(s); that the data symbols are not impacted by the transient period(s); or that the reference symbol and data symbol both are influenced, sharing the "burden" of the signal being distorted by the transient period.

In certain embodiments, the choice of reference symbol placement to ensure either of the above-mentioned cases may be based on one or multiple factors, such as one or more of: SRS transmission; number of consecutively scheduled TTIs for data (e.g., sTTIs); UL power in the scheduled TTI; MCS; modulation and/or coding rate of the transmission; and one or more characteristics of the reference symbol(s).

In certain embodiments, several ON/OFF masks may be pre-defined or pre-configured, but only one may be valid for a given situation. For example, only one ON/OFF mask may be allowed for the case that consecutive TTIs are scheduled to a wireless device (e.g., one of the examples given in FIGS. 6 and 7). In such a scenario, the method defines how the network node adapts scheduling information (e.g., the position of the reference symbol (e.g., DMRS) in an UL TTI (e.g., sTTI) according to the allowed ON/OFF mask for a given situation.

Certain embodiments of the present disclosure may provide one or more technical advantages. For example, in certain embodiments the wireless device behavior with respect to the ON/OFF time mask may advantageously be well-defined for different TTI patterns. As another example, the wireless device behavior with respect to the ON/OFF time mask may be advantageously optimized to achieve high throughput, for example, when: non-consecutive TTI patterns are used; when different TTI patterns are used in consecutive TTIs and the wireless device is allocated resources in these consecutive TTI; and/or when different TTI patterns are used in consecutive TTIs and the wireless device is allocated overlapping resources in these consecutive TTIs. Other advantages may be readily apparent to one having skill in the art. Certain embodiments may have none, some, or all of the recited advantages.

Figure 8:
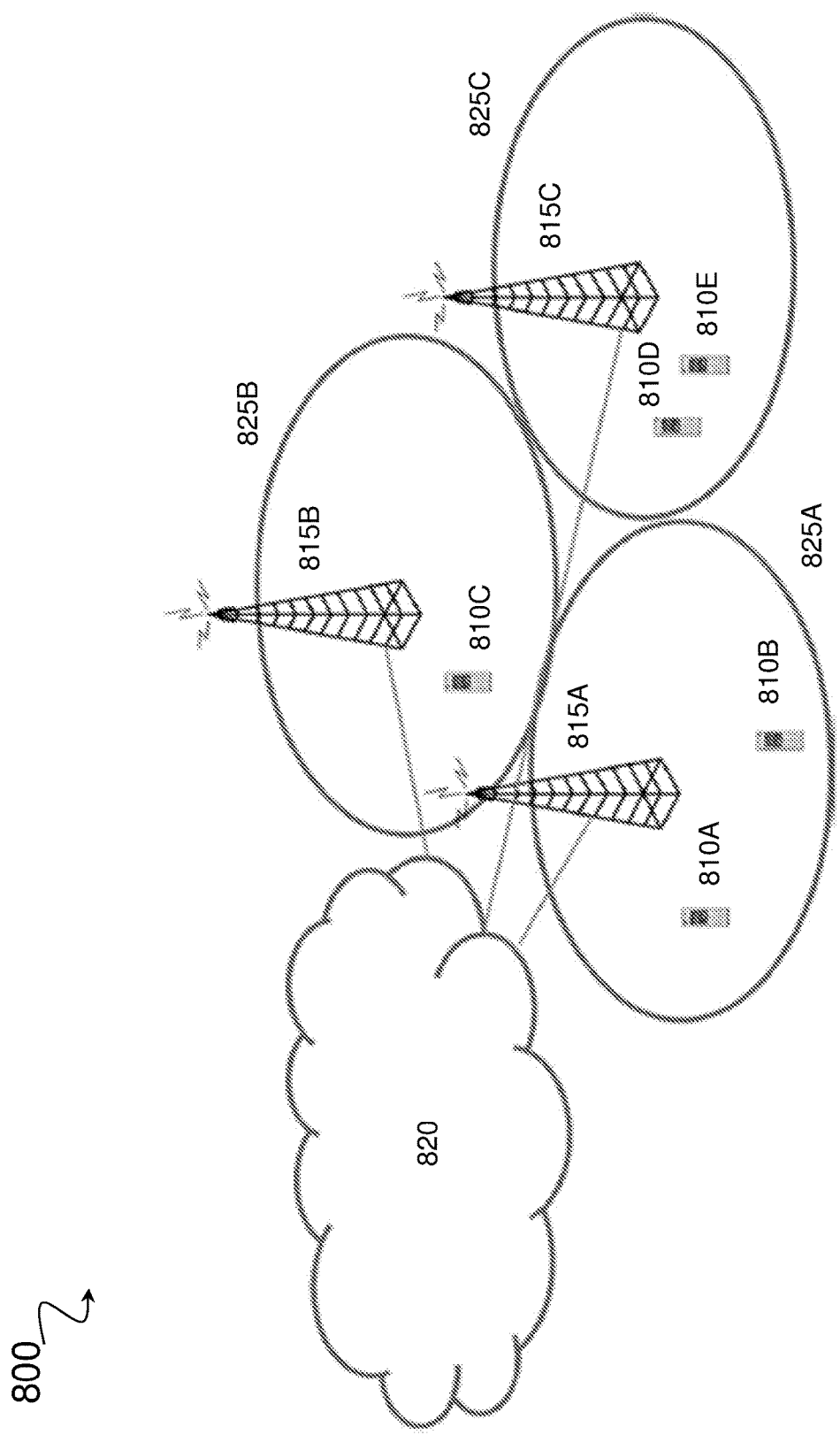
FIG. 8 is a block diagram illustrating an embodiment of a network, in accordance with certain embodiments.

FIG. 8 is a block diagram illustrating an embodiment of a network 800, in accordance with certain embodiments. Network 800 includes one or more wireless devices 810 (e.g., UEs), and one or more network node(s) 815 (e.g., eNBs or gNBs). More particularly, in the example of FIG. 8 network 800 includes wireless devices 810A-E and network nodes 815A-C. Wireless devices 810 may communicate with network nodes 815 over a wireless interface. For example, a wireless device 810 may transmit wireless signals to one or more of network nodes 815, and/or receive wireless signals from one or more of network nodes 815. The wireless signals may contain voice traffic, data traffic, control signals, and/or any other suitable information. In some embodiments, each network node 815 has an associated area of wireless signal coverage 825 (e.g., network node 815A has an associated area of wireless signal coverage 825A, network node 815B has an associated area of wireless signal coverage 825B, and network node 815C has an associated area of wireless signal coverage 825C). In some embodiments, wireless devices 810 may have device-to-device (D2D) capability. Thus, wireless devices 810 may be able to receive signals from and/or transmit signals directly to another wireless device.

Wireless devices 810 may be configured to operate in carrier aggregation (CA), implying aggregation of two or more carriers in at least one of DL and UL directions. The term fallback mode refers to a CA configuration which contains fewer component carriers (CCs) than the maximum number of CCs in a CA combination supported by a wireless device 810. For example, a wireless device 810 supporting a CA combination with a maximum CA configuration of 4 DL CCs and 1 UL CC may support the following 3 fallback modes: 3 DL CCs and 1 UL CC; 1 DL CCs and 1 UL CC; and DL CC and 1 UL CC (i.e., single carrier operation). The term fallback mode may also be interchangeably referred to as lower order CA combination, lower order CA configuration, fallback CA mode, fallback CA configuration mode, fallback CA combination etc.

As used herein, a CC may also be interchangeably referred to as a carrier, an aggregated carrier, a Primary Component Carrier (PCC), or a Secondary Component Carrier (SCC) configured at a wireless device 810 by a network node 815 using higher layer signaling (e.g., by sending a Radio Resource Control (RRC) configuration message to the wireless device 810). The configured CC is used by the network node 815 for serving the wireless device 810 on the serving cell (e.g., on Primary Cell (PCell), Primary Secondary Cell (PSCell), Secondary Cell (SCell), etc.) of the configured CC. The configured CC is also used by the wireless device 810 for performing one or more radio measurements (e.g., Reference Signal Received Power (RSRP), Reference Signal Received Quality (RSRQ), etc.) on the cells operating on the CC (e.g., PCell, SCell or PSCell and neighboring cells).

With CA, a wireless device 810 can have multiple serving cells, wherein the term "serving" herein means that the wireless device 810 is configured with the corresponding serving cell and may receive from and/or transmit data to a network node 815 on the serving cell (e.g., on PCell or any of the SCells). The data is transmitted or received via physical channels (e.g., Physical Downlink Shared Channel (PDSCH) in DL, Physical Uplink Shared Channel (PUSCH) in UL, etc.).

In certain embodiments, network nodes 815 may interface with a radio network controller (RNC). The RNC may control network nodes 815 and may provide certain radio resource management functions, mobility management functions, and/or other suitable functions. In certain embodiments, the functions of the RNC may be included in network node 815. The RNC may interface with a core network node. In certain embodiments, the RNC may interface with the core network node via an interconnecting network 820. Interconnecting network 820 may refer to any interconnecting system capable of transmitting audio, video, signals, data, messages, or any combination of the preceding. Interconnecting network 820 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 810. Wireless devices 810 may exchange certain signals with the core network node using the non-access stratum layer. In non-access stratum signaling, signals between wireless devices 810 and the core network node may be transparently passed through the radio access network. In certain embodiments, network nodes 815 may interface with one or more network nodes over an internode interface, such as, for example, an X2 interface.

As described above, example embodiments of network 800 may include one or more wireless devices 810, and one or more different types of network nodes capable of communicating (directly or indirectly) with wireless devices 810.

In some embodiments, the non-limiting term wireless device is used. Wireless devices 810 described herein can be any type of wireless device capable of communicating with network nodes 815 or another wireless device in a cellular or mobile communication system (e.g., over radio signals). Examples of wireless devices include a UE, a radio communication device, target device, UE, D2D UE, machine-type-communication (MTC) UE or UE capable of machine-to-machine (M2M) communication, low-cost and/or low-complexity UE, a sensor equipped with UE, tablet, Personal Digital Assistant (PDA), mobile terminals, smart phone, laptop embedded equipped (LEE), laptop mounted equipment (LME), USB dongles, Customer Premises Equipment (CPE), etc. Wireless devices 810 may operate under either normal coverage or enhanced coverage with respect to its serving cell. The enhanced coverage may be interchangeably referred to as extended coverage. Wireless devices 810 may also operate in a plurality of coverage levels (e.g., normal coverage, enhanced coverage level 1, enhanced coverage level 2, enhanced coverage level 3 and so on). In some cases, wireless devices 810 may also operate in out-of-coverage scenarios.

Also, in some embodiments the non-limiting term network node is used. It can be any kind of network node or radio network node. Examples of network nodes include a base station (BS), radio BS, Node B, multi-standard radio (MSR) radio node such as MSR BS, eNB, Master eNB (MeNB), Secondary eNB (SeNB), gNB, network controller, RNC, BS controller (BSC), relay node, donor node controlling relay, base transceiver station (BTS), access point (AP), radio AP, transmission point, transmission node, Remote Radio Unit (RRU), Remote Radio Head (RRH), nodes in distributed antenna system (DAS), Multi-cell/multicast Coordination Entity (MCE), core network node (e.g., Mobile Switching Center (MSC), Mobility Management Entity (MME), etc.), Operations & Management (O&M), Operations Support System (OSS), Self-Organizing Network (SON), positioning node (e.g., Evolved-Serving Mobile Location Center (E-SMLC)), Minimization of Drive Test (MDT), or any other suitable network node.

The terminology such as network node and wireless device should be considered non-limiting and does not imply a certain hierarchical relation between the two; in general "network node" could be considered as device 1 and "wireless device" as device 2, and these two devices communicate with each other over some radio channel.

Example embodiments of wireless devices 810, network nodes 815, and other network nodes (such as RNC or core network node) are described in more detail below with respect to FIGS. 16-20.

Although FIG. 8 illustrates a particular arrangement of network 800, the present disclosure contemplates that the various embodiments described herein may be applied to a variety of networks having any suitable configuration. For example, network 800 may include any suitable number of wireless devices 810 and network nodes 815, as well as any additional elements suitable to support communication between wireless devices or between a wireless device and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any RAT or multi-RAT systems in which a wireless device receives and/or transmits signals (e.g., data). For example, the various embodiments described herein may be applicable to LTE, LTE-Advanced, New Radio (NR), 4G, 5G, Narrowband Internet-of-Things (NB-IoT), MulteFire, UTRA, E-UTRA, UMTS, HSPA, GSM, cdma2000, WCDMA, WiMax, UMB, WiFi, Bluetooth, another suitable radio access technology, or any suitable combination of one or more radio access technologies. In certain embodiments, wireless devices 810 and network nodes 815 may be capable of supporting a single or multiple RATs. Although certain embodiments may be described in the context of wireless transmissions in the UL, the present disclosure contemplates that the various embodiments are equally applicable in the DL.

The present disclosure contemplates various embodiments that define the wireless device (e.g., UE) behavior and network node (e.g., eNB) behavior with respect to ON/OFF time mask for cases of UL transmission on short TTI. The various embodiments disclosed herein are described in detail below.

As described above, according to one example embodiment a method in a wireless device 810 (e.g., wireless device 810A) is disclosed. Wireless device 810A receives an UL grant from a network node 815 (e.g., network node 815A). The UL grant schedules one or more uplink transmissions by the wireless device. In certain embodiments, the one or more UL transmissions may be scheduled using sTTIs. As used herein, an sTTI may refer to a shortened TTI; a transmission time for encoding and interleaving one or more signals; a slot; a sub-slot; a mini-slot; a short subframe; and a mini-subframe.

Wireless device 810A selects an ON/OFF time mask to use for transmitting the one or more UL transmissions. Wireless device 810A determines, based on the received UL grant, an allowed placement of a transient period of the selected ON/OFF time mask and a duration of the transient period to use for the one or more UL transmissions. As used herein, the term transient period refers to a duration during which the transmit signal may change between ON period and OFF period or the duration during which the signal may change its transmit power level (e.g., from power, P1 to power, P2 or vice versa). The transient period can lie between any sets of time resources (e.g., UL and DL subframes, between any two symbols, between any group of symbols, between any group of slots or subframes, etc.). As used herein, the term time resource may correspond to any type of physical resource or radio resource expressed in terms of length of time. Examples of time resources include: symbol, time slot, subframe, short subframe, radio frame, TTI, interleaving time, etc. During the transient period, wireless device 810A may not be required to meet any requirement (e.g., such as OFF power limit, ON power limit, transmit power accuracy etc.). The transient period may also be interchangeably referred to as transient time, ramping time, slew, etc.

In the example embodiments described below, it is assumed that several ON/OFF masks are pre-defined or pre-configured for a given situation. For instance, the examples of FIG. 6 and FIG. 7 described above could be ON/OFF masks allowed for the case that consecutive TTIs are scheduled to wireless device 810A. The method described herein defines how wireless device 810A selects one of the pre-defined ON/OFF masks at a given time. In certain embodiments, the selection method may be based on scheduling information received by wireless device 810A from network node 815A.

Although certain embodiments are described below using DMRS as an example reference signal, the present disclosure is not limited to such an example. Rather, the present disclosure contemplates that any suitable reference signal may be used.

In the various embodiments described below, the decision to place the transient period over the reference symbol (e.g., DMRS symbol) or data symbol can be based on any suitable criteria. For example, in certain embodiments the decision to place the transient period over the DMRS symbol or data symbol can be based on one or more of: one or more pre-defined rules in the specification; a modulation to be used for the one or more UL transmissions; a coding rate to be used for the one or more UL transmissions; a modulation and coding scheme (MCS) to be used for the one or more UL transmissions; a power level of one or more sTTIs; a power level of one or more symbols; one or more characteristics of the reference symbol(s) (e.g., whether they are shared or not); a position of the reference symbol(s); and a number of consecutively scheduled UL transmissions using sTTIs. In certain embodiments, wireless device 810A can extract this information from the received UL grant or scheduling information.

As described above, wireless device 810A receives an UL grant from network node 815A scheduling one or more UL transmissions by wireless device 810A. Wireless device 810A selects an ON/OFF time mask to use for transmitting the one or more UL transmissions, and determines, based on the received UL grant, an allowed placement of a transient period of the selected ON/OFF time mask and a duration of the transient period to use for the one or more UL transmissions.

In certain embodiments, wireless device 810A receives an UL grant from network node 815A for at least one UL sTTI directly preceding or following a scheduled SRS transmission. In such a scenario, wireless device 810A determines an allowed placement and duration of the transient period such that wireless device 810A starts the power ramp up or down so that the transient period does not affect SRS. As a result, the impact on the data throughput after or before SRS is advantageously minimized. In certain embodiments, wireless device 810A may receive a dynamic SRS triggering indication in an UL grant for subframe n after receiving an UL grant covering the first symbol in subframe n+1, thus directly following the SRS, and move the transient period to be contained outside of the SRS.

In certain embodiments, wireless device 810A receives an UL grant from network node 815A for at least one data UL sTTI directly preceding or following an sPUCCH transmission from wireless device 810A. Wireless device 810A may determine a position of at least one of a reference symbol of the at least one data UL transmission relative to the scheduled control channel transmission in time; a data symbol of the at least one data uplink transmission relative to the scheduled control channel transmission in time; a reference symbol of the scheduled control channel transmission; and a data symbol of the scheduled control channel transmission. Wireless device 810 determines an allowed placement and duration of the transient period based on information in the received UL grant. As one example, wireless device 810A may place the transient period in one a DMRS symbol of the data UL sTTI if the DMRS symbol is next to the sPUCCH transmission in time. As another example, wireless device 810A may place the transient period in both a data symbol of the UL sTTI and the sPUCCH if the data symbol in the UL sTTI is next to the sPUCCH transmission in time. As still another example, wireless device 810A may place the transient period in both the DMRS symbol of the data UL sTTI and the DMRS of the sPUCCH, if both DMRS symbols are placed consecutively. As yet another example, wireless device 810A may place the transient period in both the data symbol of the data UL sTTI and the data symbol of the sPUCCH, if both DMRS symbols are placed consecutively.

In certain embodiments, wireless device 810A receives an UL grant from network node 815A for more than one UL sTTIs. In such a scenario, wireless device 810A determines, based on the received UL grant, an allowed placement and duration for a transient period. In certain embodiments, the allowed placement and duration for the transient period is determined so that the transient period overlaps with at least one of: a DMRS symbol of at least one of the scheduled UL sTTIs; a data symbol of at least one of the scheduled UL sTTIs; and a combination of data symbol and DMRS from two of the scheduled UL sTTIs.

As a first example (where there is no DMRS sharing), the UL grant may indicate separate UL DMRS positions in the UL grant for all scheduled sTTIs. Based on this information, wireless device 810A determines the allowed placement and duration of the transient period so that the transient period overlaps with the DMRS symbol of at least one of the scheduled UL sTTIs. To determine the position of the transient period, wireless device 810A may use information about one or more of the applied transmit power, the UL DMRS position, and the number of scheduled UL sTTIs. This first example is described in more detail below in relation to FIG. 9.

Figure 9:
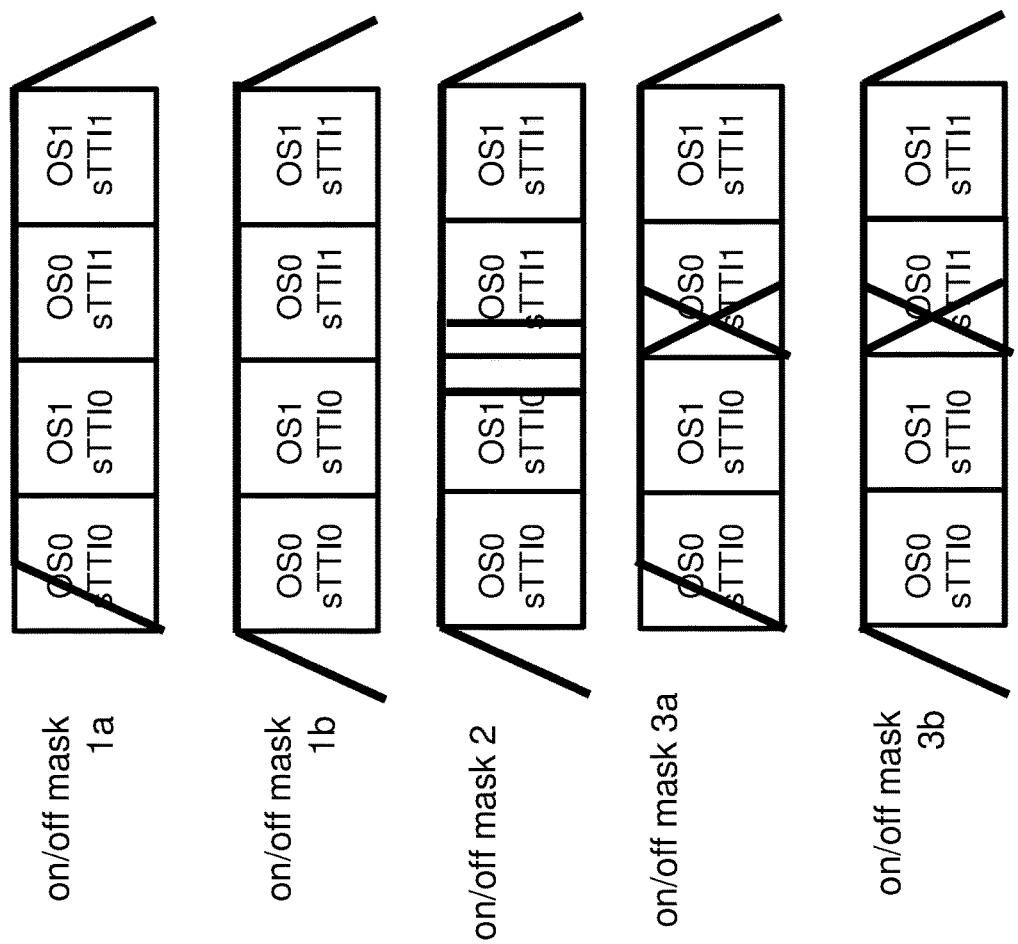
FIG. 9 illustrates examples of ON/OFF power masks that can be used when there is no DMRS sharing, in accordance with certain embodiments.

FIG. 9 illustrates examples of ON/OFF power masks that can be used when there is no DMRS sharing, in accordance with certain embodiments. More particularly, FIG. 9 illustrates various examples over two sTTIs, sTTI 0 and sTTI 1. Each sTTI includes two symbols (i.e., sTTI 0 includes symbols OS0 and OS1, and sTTI 1 includes symbols OS0 and OS1). Furthermore, FIG. 9 illustrates five example ON/OFF masks 1a, 1b, 2, 3a, and 3b. In the example of FIG. 9, the specification defines the power ON/OFF masks depicted as allowed for the case that wireless device 810A is scheduled over two consecutive sTTIs.

If wireless device 810A determines no power change between consecutively scheduled sTTIs sTTI 0 and sTTI 1, and the UL grant indicates an UL DMRS position in OS0 of sTTI 0, wireless device 810A selects power ON/OFF mask 1a or 1b shown in FIG. 9. This may advantageously protect the data symbol placed in OS1 of sTTI0 and anywhere in sTTI1.

If power change is signaled or expected between the consecutively scheduled sTTIs sTTI 0 and sTTI 1, and the UL grant informs of a DMRS position in OS1 of sTTI 0 and in OS0 of sTTI 1, wireless device 810A selects power ON/OFF mask 2 shown in FIG. 9. This may advantageously protect the data symbol placed in OS0 of sTTI 0 and in OS1 of sTTI 1.

If power change is signaled or expected between the consecutively scheduled sTTIs sTTI 0 and sTTI 1, and the UL grant informs of a DMRS position in OS0 of sTTI 0 and in OS0 of sTTI 1, wireless device 810A selects power ON/OFF mask 3a or 3b shown in FIG. 9. This may advantageously protect the data symbol placed in OS1 of sTTI 0 and in OS1 of sTTI 1.

Returning to FIG. 8, in a second example (where there is DMRS sharing) the UL grant may indicate a shared UL DMRS position in the UL grant for all scheduled sTTIs. Based on this information, wireless device 810A determines the allowed placement and duration of the transient period so that the transient period does not affect the DMRS symbol. In certain embodiments, to determine the position of the transient period wireless device 810A may use information about one or more of: the applied transmit power; the UL DMRS position; and the number of scheduled UL sTTIs.

In certain embodiments, wireless device 810A receives an UL grant from network node 815A for a single sTTI. In such a scenario, wireless device 810A determines, based on the received UL grant, an allowed placement and duration for a transient period. In certain embodiments, the allowed placement and duration for the transient period is determined such that wireless device 810A selects the power ON/OFF mask illustrated in FIG. 10. This may advantageously optimize transmission time.

Figure 10:
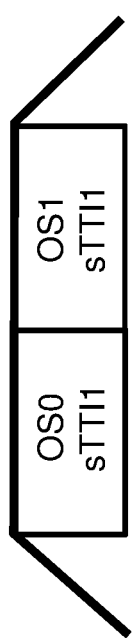
FIG. 10 illustrates an example ON/OFF mask that may be selected when the received UL grant schedules a single sTTI, in accordance with certain embodiments.

FIG. 10 illustrates an example ON/OFF mask that may be selected when the received UL grant schedules a single sTTI. More particularly, FIG. 10 illustrates an example with a single sTTI, sTTI1. sTTI1 includes two symbols, OS0 and OS1. As shown in FIG. 10. The ramping up and down takes place outside of sTTI 1.

Returning to FIG. 8, according to another example embodiment a method in a network node is disclosed. The method relates to scheduling decisions at network node 815A based on pre-defined ON/OFF masks at wireless device 810. Network node 815A determines a position of a reference symbol in one or more UL transmissions to be scheduled for wireless device 810A. Network node 815A sends an UL grant to wireless device 810A for scheduling the one or more UL transmissions. In certain embodiments, the UL grant indicates the determined position of the reference symbol in the one or more UL transmissions.

Various examples embodiments are described in more detail below. In the example embodiments described below, it is assumed that several ON/OFF masks are pre-defined or pre-configured but only one is valid for a given situation. For instance, only one ON/OFF mask may be allowed for the case that consecutive TTIs are scheduled to wireless device 810A, such as, for example, one of those illustrated in FIG. 6 and FIG. 7 described above. Network node 815A adapts some scheduling information (for example, the position of the reference symbols (e.g., DMRS) in an UL sTTI) according to the allowed ON/OFF mask for a given situation. Although certain example embodiments are described using DMRS as the reference symbol, the present disclosure is not limited to this example embodiment. Rather, the present disclosure contemplates that any suitable reference signal may be used.

In certain embodiments, the placement of the DMRS symbol may be chosen by the network to ensure that: the DMRS symbol(s) are not impacted by the transient period (s); the data symbols are not impacted by the transient period(s); or that the DMRS and data symbol both are influenced, sharing the "burden" of the signal being distorted by the transient period. The choice of DMRS symbol placement to ensure one of the above mentioned cases may be based on one or a combination of multiple factors, such as one or more of: a position of an SRS transmission relative to the one or more UL transmissions; a number of consecutively scheduled data UL transmissions for wireless device 810A; an UL power in the one or more uplink transmissions; an MCS used for the one or more UL transmissions; a modulation rate of the one or more UL transmissions; a coding rate of the one or more UL transmissions; one or more characteristics of the reference symbol; and any other suitable criteria. Detailed examples are described below.

When there is UL data for wireless device 810A, network node 815A may determine a position of a reference symbol in one or more UL transmissions to be scheduled for wireless device 810A. Network node 815A sends an UL grant to wireless device 810A for scheduling the one or more UL transmissions. In certain embodiments, the UL grant indicates the determined position of the reference symbol in the one or more UL transmissions.

As a first example, in cases where there is an SRS before and a low-medium MCS will be used for the one or more UL transmissions, network node 815A sends an UL grant to wireless device 810A for at least one UL sTTI. The UL grant indicates an UL DMRS position that enables protection of data symbols of the UL sTTI from the transient period if a robust MCS was selected and SRS transmission by wireless device 810A immediately precedes the scheduled sTTI As a second example, in cases where there is an SRS before and a high MCS will be used for the one or more UL transmissions, network node 815A sends an UL grant to wireless device 810A for at least one UL sTTI. The UL grant indicates an UL DMRS position that enables protection of the DMRS symbol of the UL sTTI from the transient period if a high MCS was selected and SRS transmission by wireless device 810A immediately precedes the scheduled sTTI.

As a third example, in cases where there is an SRS in the UL sTTI, network node 815A sends an UL grant to wireless device 810A for the UL sTTI that includes an SRS transmission by wireless device 810A. The UL grant indicates an UL DMRS position that is not within the boundaries of the UL sTTI with SRS transmission. In some cases, this third example embodiment can be combined with network node 815A sending an UL grant to wireless device 810A for at least another UL sTTI preceding the UL sTTI that includes a SRS transmission. In such a scenario, the UL grant indicates an UL DMRS position that is within the boundaries of the UL sTTI preceding the UL sTTI with SRS transmission. This may advantageously make use (as much as possible) of the last UL sTTI, despite SRS transmission and the corresponding transient period.

Figure 6:
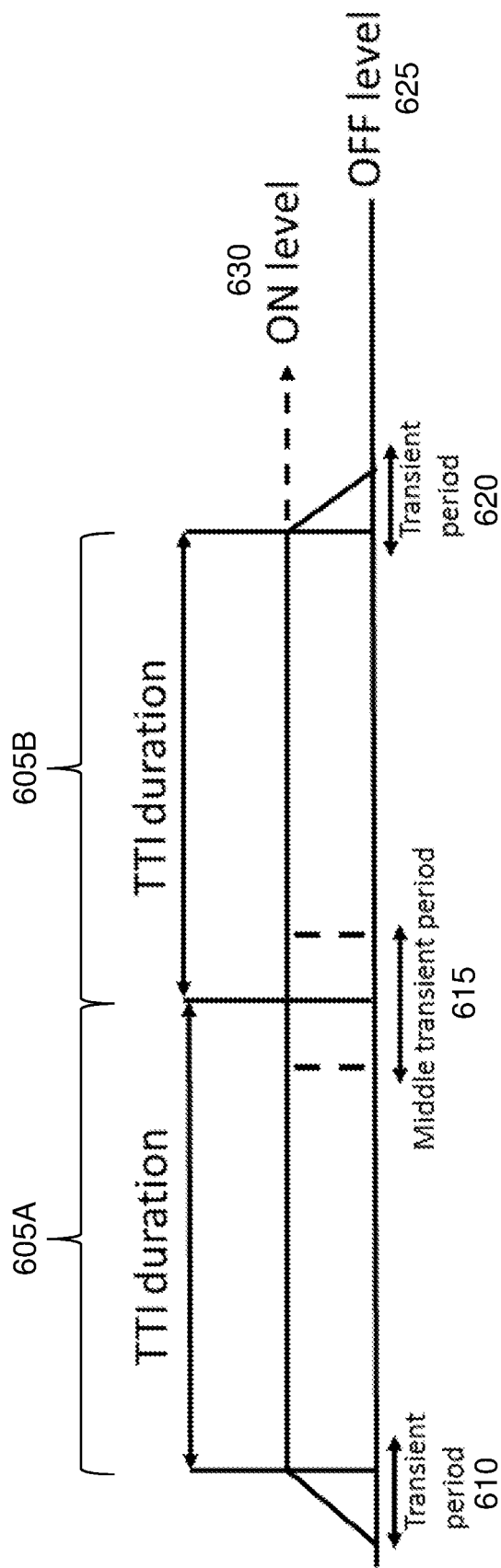
FIG. 6 illustrates a possible ON/OFF mask for consecutive TTIs when there are power changes between consecutive TTIs with ramp up/down in between consecutive TTIs.
Figure 7:
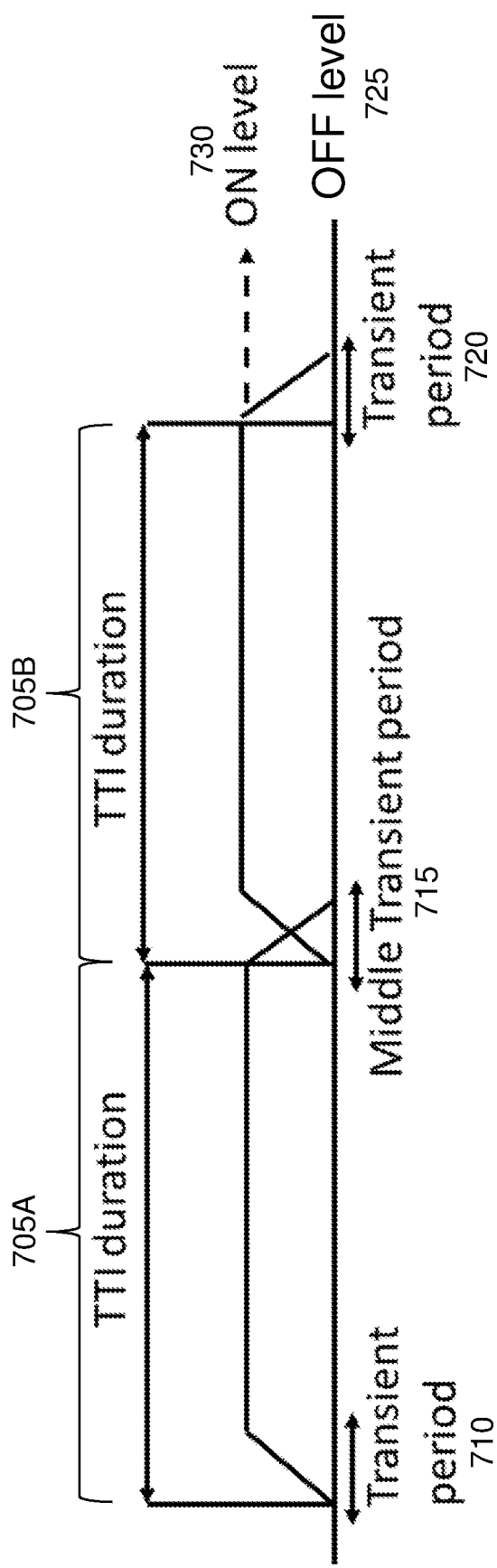
FIG. 7 illustrates a second possible ON/OFF mask for consecutive TTIs when there are power changes between consecutive TTIs with ramp up/down in between consecutive TTIs.

As a fourth example, in cases where there is DMRS sharing and power change, network node 815A sends an UL grant to wireless device 810A for more than one UL sTTIs. The UL grant indicates an UL DMRS position of the first sTTI that enables protection of DMRS from the transient period based on UL power control parameters signaled to wireless device 810A in the UL grant of all consecutively scheduled UL sTTIs. For example, if no power change is signaled between consecutive scheduled sTTI, network node 815A places the DMRS at the end of the first sTTI if the transient period specified for this case is located at the beginning of the first sTTI. As another example, if power change is signaled or expected between the consecutive scheduled sTTI, network node 815A places the DMRS either: at the beginning of the first sTTI if an ON/OFF mask as shown in FIG. 6 is chosen; or at the end of the first sTTI if an ON/OFF mask as shown in FIG. 7 is chosen.

As a fifth example, in cases where there are multiple sTTI and no DMRS sharing, network node 815A sends an UL grant to wireless device 810A for more than one UL sTTIs. The UL grant indicates an UL DMRS position for each of the scheduled sTTI that enables protection of data symbols from the transient period. In some cases, the UL DMRS position may be selected also based on information about UL power to be used in the UL sTTIs, such as power control parameters signaled to wireless device 810A for the different scheduled sTTIs. For example, if no power change is signaled between consecutively scheduled sTTIs, the ON/OFF mask defined in the specification for that case may follow the one shown in FIG. 11. As another example, if power change is signaled or expected between the consecutively scheduled sTTIs, the ON/OFF mask defined in the specification for that case may follows the one shown in FIG. 12. As still another example, if power change is signaled or expected between the consecutively scheduled sTTI, the ON/OFF mask defined in the specification for that case may follow the one shown in FIG. 13. These scenarios and the resulting placement of the DMRS by network node 815A are described in more detail below in relation to FIGS. 11-13.

Figure 11:
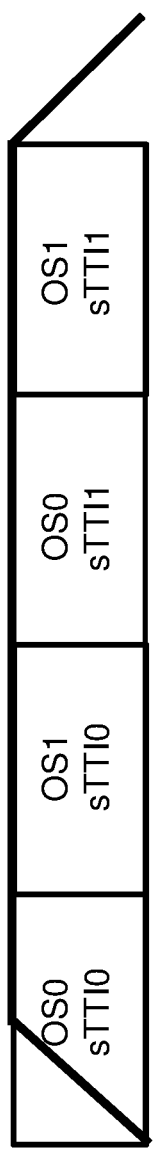
FIG. 11 illustrates an example of an ON/OFF time mask that can be used when there is no power change signaled between consecutively scheduled sTTIs, in accordance with certain embodiments.

FIG. 11 illustrates an example of an ON/OFF time mask that can be used when there is no power change signaled between consecutively scheduled sTTIs, in accordance with certain embodiments. More particularly, FIG. 11 illustrates an example of consecutively scheduled sTTIs sTTI 0 and sTTI 1. In the example of FIG. 11, sTTI 0 includes symbols OS0 and OS1, and sTTI 1 includes symbols OS0 and OS1. As shown in FIG. 11, the ramping up during the transient period takes place in OS0 of sTTI 0, and the ramping down during the transient period takes place outside of sTTI 1. As described above, the ON/OFF time mask illustrated in FIG. 11 may be used if no power change is signaled between consecutively scheduled sTTIs sTTI 0 and sTTI 1. Where the ON/OFF mask defined in the specification for that case follows the one shown in FIG. 11, network node 815A signals (e.g., in the UL grant) a DMRS position in OS0 of sTTI 0 so that the data symbol placed in OS1 of sTTI 0 and anywhere in sTTI 1 are protected.

Figure 12:
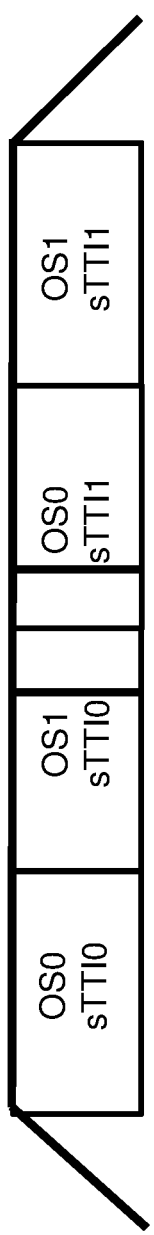
FIG. 12 illustrates an example of an ON/OFF time mask that can be used when power change is signaled or expected between the consecutively scheduled sTTIs, in accordance with certain embodiments.

FIG. 12 illustrates an example of an ON/OFF time mask that can be used when power change is signaled or expected between the consecutively scheduled sTTIs, in accordance with certain embodiments. More particularly, FIG. 12 illustrates an example of consecutively scheduled sTTIs sTTI 0 and sTTI 1. In the example of FIG. 12, sTTI 0 includes symbols OS0 and OS1, and sTTI 1 includes symbols OS0 and OS1. As shown in FIG. 12, the ramping up during the first transient period takes place outside of sTTI 0, and the ramping down during the transient period takes place outside of sTTI 1. As described above, in this example power change is signaled or expected between consecutively scheduled sTTI 0 and sTTI. In the example of FIG. 12, the power changes (e.g., ramp up/down) between consecutive sTTIs sTTI 0 and sTTI1 takes place in both sTTI 0 and sTTI 1 during a middle transient period (similar to that described above in relation to FIG. 6). In such a scenario, network node 815A signals (e.g., in the UL grant) a DMRS position in OS1 of sTTI 0 and in OS0 of sTTI 1 so that the data symbol placed in OS0 of sTTI 0 and in OS1 of sTTI 1 are protected.

Figure 13:
FIG. 13 illustrates another example of an ON/OFF time mask that can be used when power change is signaled or expected between the consecutively scheduled sTTIs, in accordance with certain embodiments.

FIG. 13 illustrates another example of an ON/OFF time mask that can be used when power change is signaled or expected between the consecutively scheduled sTTIs, in accordance with certain embodiments. More particularly, FIG. 13 illustrates an example of consecutively scheduled sTTIs sTTI 0 and sTTI 1. In the example of FIG. 13, sTTI 0 includes symbols OS0 and OS1, and sTTI 1 includes symbols OS0 and OS1. As shown in FIG. 13, the ramping up during the first transient period takes place within OS0 of sTTI 0, and the ramping down during the second transient period takes place outside of sTTI 1. As described above, in this example power change is signaled or expected between consecutively scheduled sTTI 0 and sTTI. In the example of FIG. 13, the power changes (e.g., ramp up/down) between consecutive sTTIs sTTI 0 and sTTI1 takes place during a middle transient period in OS0 of sTTI1 (similar to that described above in relation to FIG. 7). In such a scenario, network node 815A signals a DMRS position anywhere in sTTI 0 and a DMRS position in OS0 of sTTI 1 so that the data symbol placed in OS1 of sTTI 1 is protected.

Figure 14:
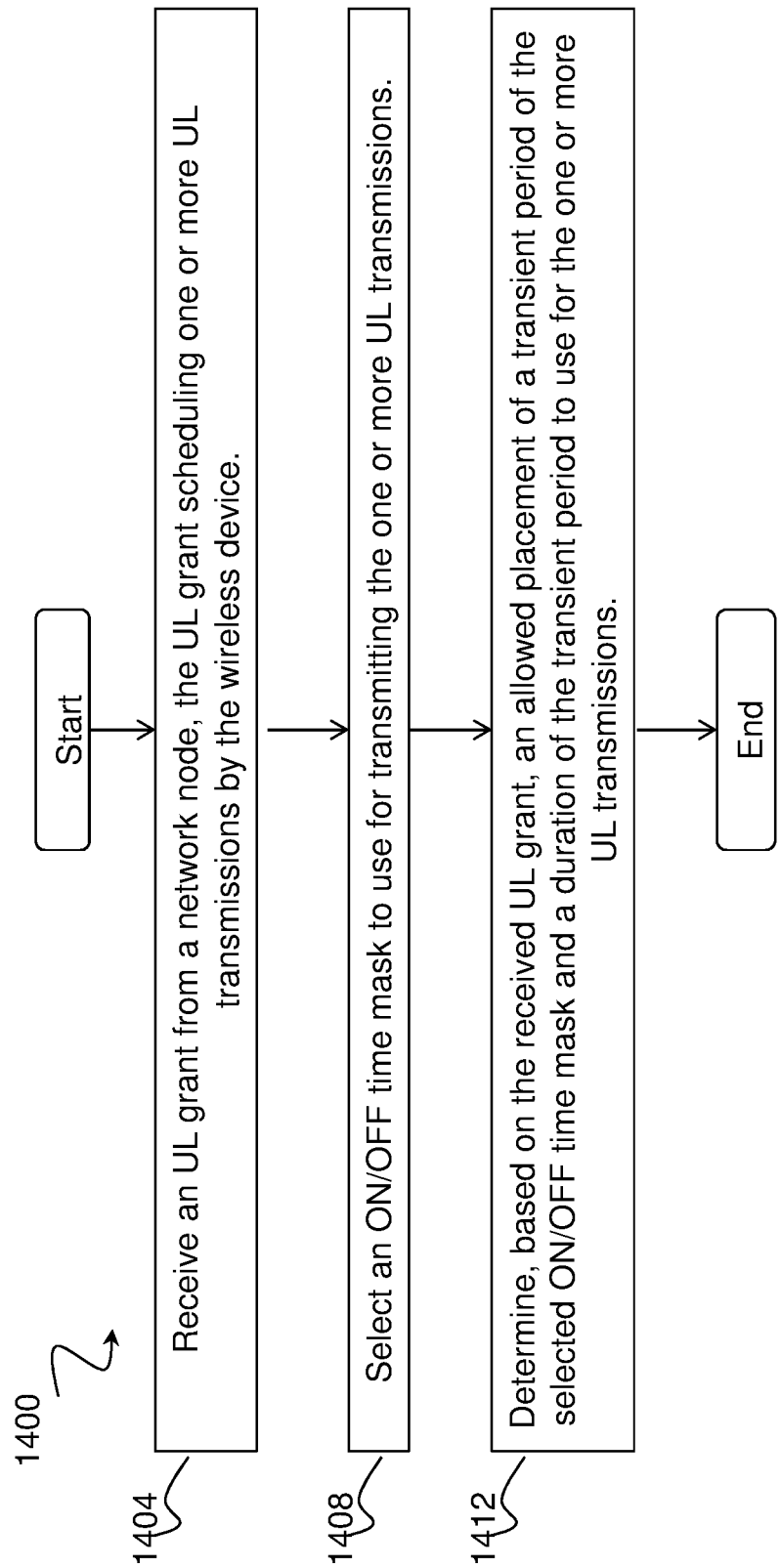
FIG. 14 is a flow diagram of a method in a wireless device, in accordance with certain embodiments.

FIG. 14 is a flow diagram of a method 1400 in a wireless device, in accordance with certain embodiments. Method 1400 begins at step 1404, where the wireless device receives an UL grant from a network node, the UL grant scheduling one or more UL transmissions by the wireless device. In certain embodiments, the one or more UL transmissions may be scheduled using short transmission time intervals.

At step 1408, the wireless device selects an ON/OFF time mask to use for transmitting the one or more UL transmissions. In certain embodiments, selecting the ON/OFF time mask to use for transmitting the one or more UL transmissions may comprise selecting an ON/OFF time mask in which the transient period does not overlap with any symbols of the scheduled one or more UL transmissions.

At step 1412, the wireless device determines, based on the received UL grant, an allowed placement of a transient period of the selected ON/OFF time mask and a duration of the transient period to use for the one or more UL transmissions. In certain embodiments, the method may comprise performing the scheduled one or more UL transmissions using the selected ON/OFF time mask.

In certain embodiments, determining the allowed placement and the duration of the transient period may be based on one or more of: one or more pre-defined rules; a modulation to be used for the one or more UL transmissions; a coding rate to be used for the one or more UL transmissions; a modulation and coding scheme to be used for the one or more UL transmissions; a power level of one or more sTTIs; a power level of one or more symbols; a position of a reference symbol in the one or more UL transmissions; whether the one or more UL transmissions share reference symbols; and a number of consecutively scheduled UL transmission using sTTIs.

In certain embodiments, the transient period of the selected ON/OFF time mask may overlap with one or more of: a reference symbol of at least one of the scheduled one or more UL transmissions; and a data symbol of at least one of the scheduled one or more UL transmissions.

In certain embodiments, the scheduled one or more UL transmissions may comprise at least one UL transmission preceding or following a scheduled SRS transmission, and the transient period of the selected ON/OFF time mask does not overlap with the scheduled SRS transmission.

In certain embodiments, the scheduled one or more UL transmissions may comprise at least one data UL transmission preceding or following a scheduled control channel transmission, and the method may comprise determining a position of at least one of: a reference symbol of the at least one data UL transmission relative to the scheduled control channel transmission in time; a data symbol of the at least one data UL transmission relative to the scheduled control channel transmission in time; a reference symbol of the scheduled control channel transmission; and a data symbol of the scheduled control channel transmission. In certain embodiments, the transient period of the selected ON/OFF time mask may overlap with the reference symbol of the at least one data UL transmission if the reference symbol is next to the scheduled control channel transmission in time. In certain embodiments, the transient period of the selected ON/OFF time mask may overlap with both the data symbol of the at least one data UL transmission and the scheduled control channel transmission if the data symbol of the at least data UL transmission is next to the scheduled control channel transmission in time. In certain embodiments, the transient period of the selected ON/OFF time mask may overlap with both the reference symbol of the at least one data UL transmission and the reference symbol of the scheduled control channel transmission if both reference symbols are placed consecutively. In certain embodiments, the transient period of the selected ON/OFF time mask may overlap both the data symbol of the at least one data UL transmission and the data symbol of the scheduled control channel transmission if both the reference symbol of the at least one data UL transmission and the reference symbol of the scheduled control channel transmission are placed consecutively.

In certain embodiments, the scheduled one or more UL transmissions may comprise two or more UL transmissions, and the transient period of the selected ON/OFF time mask may overlap with a reference symbol of at least one of the two or more UL transmissions if the two or more UL transmissions have separate reference symbol positions.

In certain embodiments, the scheduled one or more UL transmissions may comprise two or more UL transmissions, and the transient period of the selected ON/OFF time mask may overlap with a data symbol of at least one of the two or more UL transmissions if the two or more UL transmissions share reference symbol positions.

In certain embodiments, the scheduled one or more UL transmissions may comprise two or more UL transmissions, and the transient period of the selected ON/OFF time mask may overlap with a reference symbol of a first UL transmission of the two or more UL transmissions and a data symbol of a second UL transmission of the two or more UL transmissions.

Figure 15:
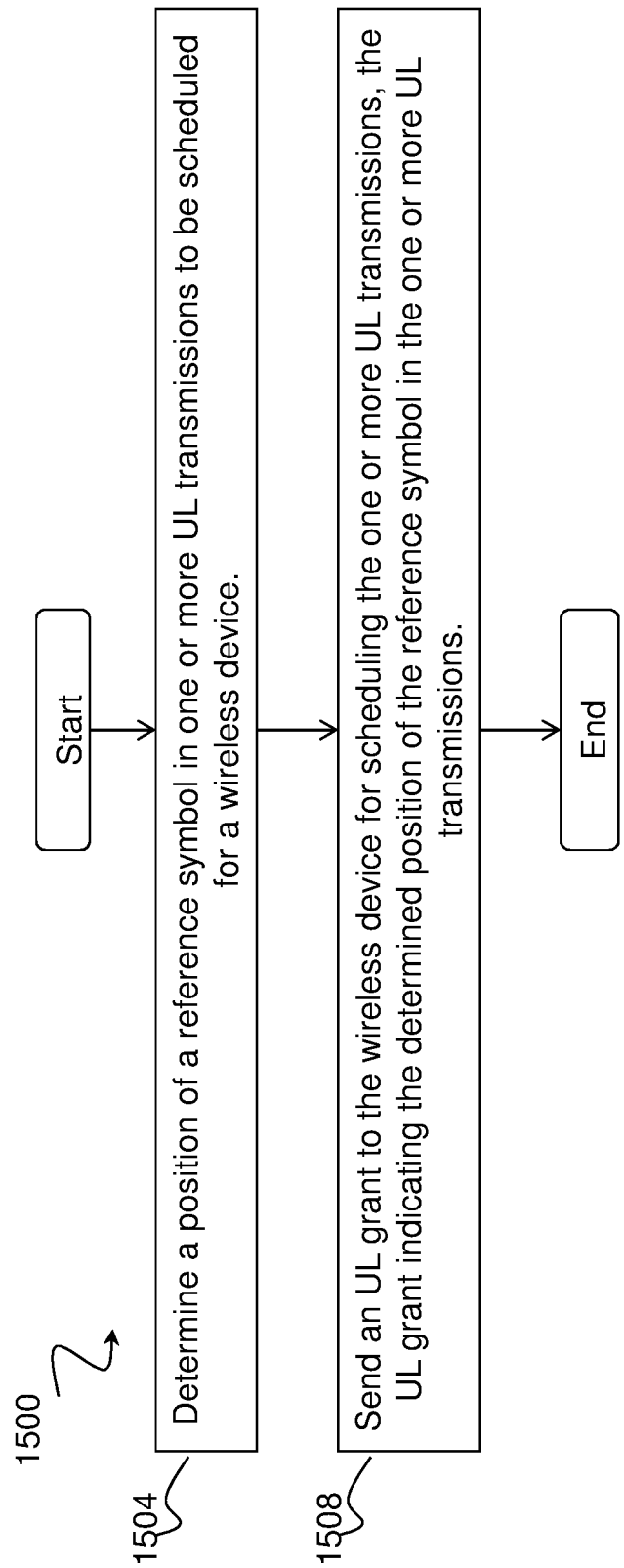
FIG. 15 is a flow diagram of a method in a network node, in accordance with certain embodiments.

FIG. 15 is a flow diagram of a method 1500 in a network node, in accordance with certain embodiments. Method 1500 begins at step 1504, where the network node determines a position of a reference symbol in one or more UL transmissions to be scheduled for a wireless device. In certain embodiments, the one or more UL transmissions to be scheduled for the wireless device may comprise one or more UL transmissions to be scheduled for the wireless device using short TTIs.

In certain embodiments, determining the position of the reference symbol in the one or more UL transmissions to be scheduled for the wireless device may be based on one or more of: a position of a Sounding Reference Signal (SRS) transmission relative to the one or more UL transmissions; a number of consecutively scheduled data UL transmissions for the wireless device; an UL power in the one or more UL transmissions; a modulation and coding scheme (MCS) used for the one or more UL transmissions; a modulation rate of the one or more UL transmissions; a coding rate of the one or more UL transmissions; and one or more characteristics of the reference symbol.

In certain embodiments, at least one of the one or more UL transmissions may be preceded by an SRS transmission and scheduled with a MCS that is below a threshold, and determining the position of the reference symbol may comprise selecting a position of the reference symbol in the at least one UL transmission that will at least partially overlap with a transient period of an ON/OFF time mask that the wireless device will use to perform the at least one UL transmission.

In certain embodiments, at least one of the one or more UL transmissions may be preceded by an SRS transmission and scheduled with a MCS scheme that is above a threshold, and determining the position of the reference symbol may comprise selecting a position of the reference symbol in the at least one UL transmission that will not overlap with a transient period of an ON/OFF time mask that the wireless device will use to perform the at least one UL transmission.

In certain embodiments, at least one of the one or more UL transmissions may comprise an SRS transmission, and determining the position of the reference symbol may comprise selecting a position of the reference symbol that will not be within a transmission time interval (TTI) used for transmitting the at least one UL transmission comprising the SRS transmission. In certain embodiments, the selected position of the reference symbol is in another UL transmission preceding the at least one UL transmission comprising the SRS transmission.

In certain embodiments, the UL grant to the wireless device may schedule consecutive UL transmissions, the consecutive UL transmissions comprising at least a first UL transmission and a second UL transmission that share the reference symbol, and determining the position of the reference symbol may be further based on whether there is a change in transmit power by the wireless device between the first UL transmission and the second UL transmission.

In certain embodiments, the UL grant to the wireless device schedules a plurality of UL transmissions that do not share the reference symbol, and determining the position of the reference symbol may comprise selecting, for each of the plurality of UL transmissions, a position of a reference symbol in each respective UL transmission that at least partially overlaps with a transient period of an ON/OFF time mask that the wireless device will use to perform each respective UL transmission. In certain embodiments, determining the position of the reference symbol may be further based on whether there is a change in transmit power by the wireless device between the plurality of UL transmissions.

At step 1508, the network node sends an UL grant to the wireless device for scheduling the one or more UL transmissions, the UL grant indicating the determined position of the reference symbol in the one or more UL transmissions.

Figure 16:
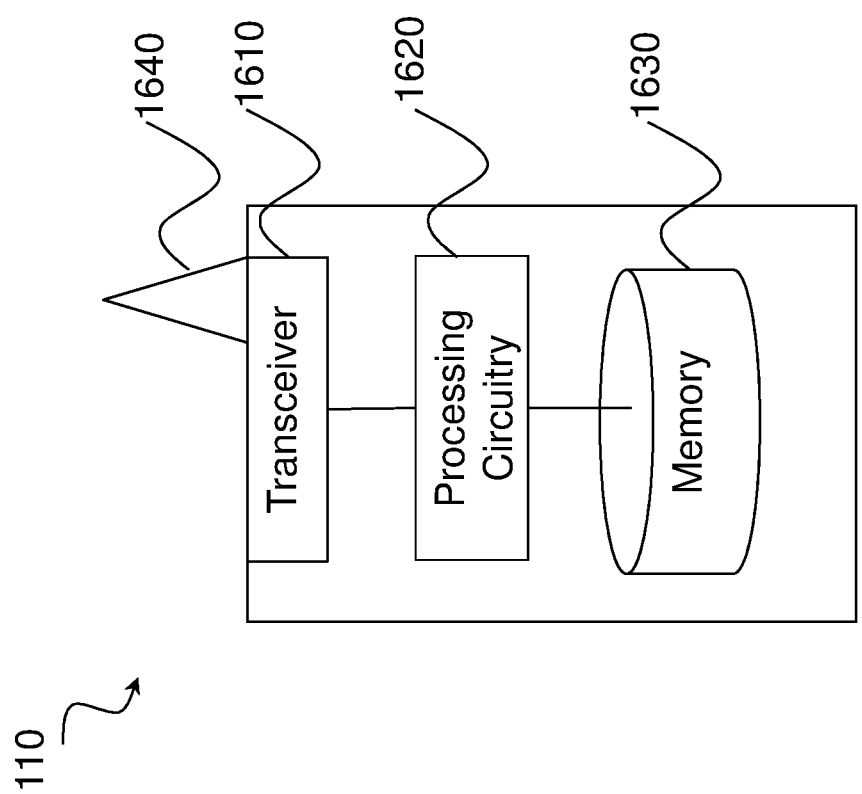
FIG. 16 is a block schematic of an exemplary wireless device, in accordance with certain embodiments.

FIG. 16 is a block schematic of an exemplary wireless device 810, in accordance with certain embodiments. Wireless device 810 may refer to any type of wireless device communicating with a node and/or with another wireless device in a cellular or mobile communication system. Examples of wireless device 810 include a mobile phone, a smart phone, a PDA, a portable computer (e.g., laptop, tablet), a sensor, an actuator, a modem, an MTC device/M2M device, LEE, LME, USB dongles, a D2D capable device, or another device that can provide wireless communication. A wireless device 810 may also be referred to as UE, a station (STA), a device, or a terminal in some embodiments. Wireless device 810 includes transceiver 1610, processing circuitry 1620, and memory 1630. In some embodiments, transceiver 1610 facilitates transmitting wireless signals to and receiving wireless signals from network node 815 (e.g., via antenna 1640), processing circuitry 1620 executes instructions to provide some or all of the functionality described above as being provided by wireless device 810, and memory 1630 stores the instructions executed by processing circuitry 1620.

Processing circuitry 1620 may include any suitable combination of hardware and software implemented in one or more modules to execute instructions and manipulate data to perform some or all of the described functions of wireless device 810, such as the functions of wireless device 810 described above in relation to FIGS. 1-15. In some embodiments, processing circuitry 1620 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1630 is generally operable to store instructions, such as a computer program, software, an application including one or more of logic, rules, algorithms, code, tables, etc. and/or other instructions capable of being executed by processing circuitry 1620. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1620.

Other embodiments of wireless device 810 may include additional components beyond those shown in FIG. 16 that may be responsible for providing certain aspects of the wireless device's functionality, including any of the functionality described above and/or any additional functionality (including any functionality necessary to support the solution described above). As just one example, wireless device 810 may include input devices and circuits, output devices, and one or more synchronization units or circuits, which may be part of the processing circuitry 1620. Input devices include mechanisms for entry of data into wireless device 810. For example, input devices may include input mechanisms, such as a microphone, input elements, a display, etc. Output devices may include mechanisms for outputting data in audio, video and/or hard copy format. For example, output devices may include a speaker, a display, etc.

Figure 17:
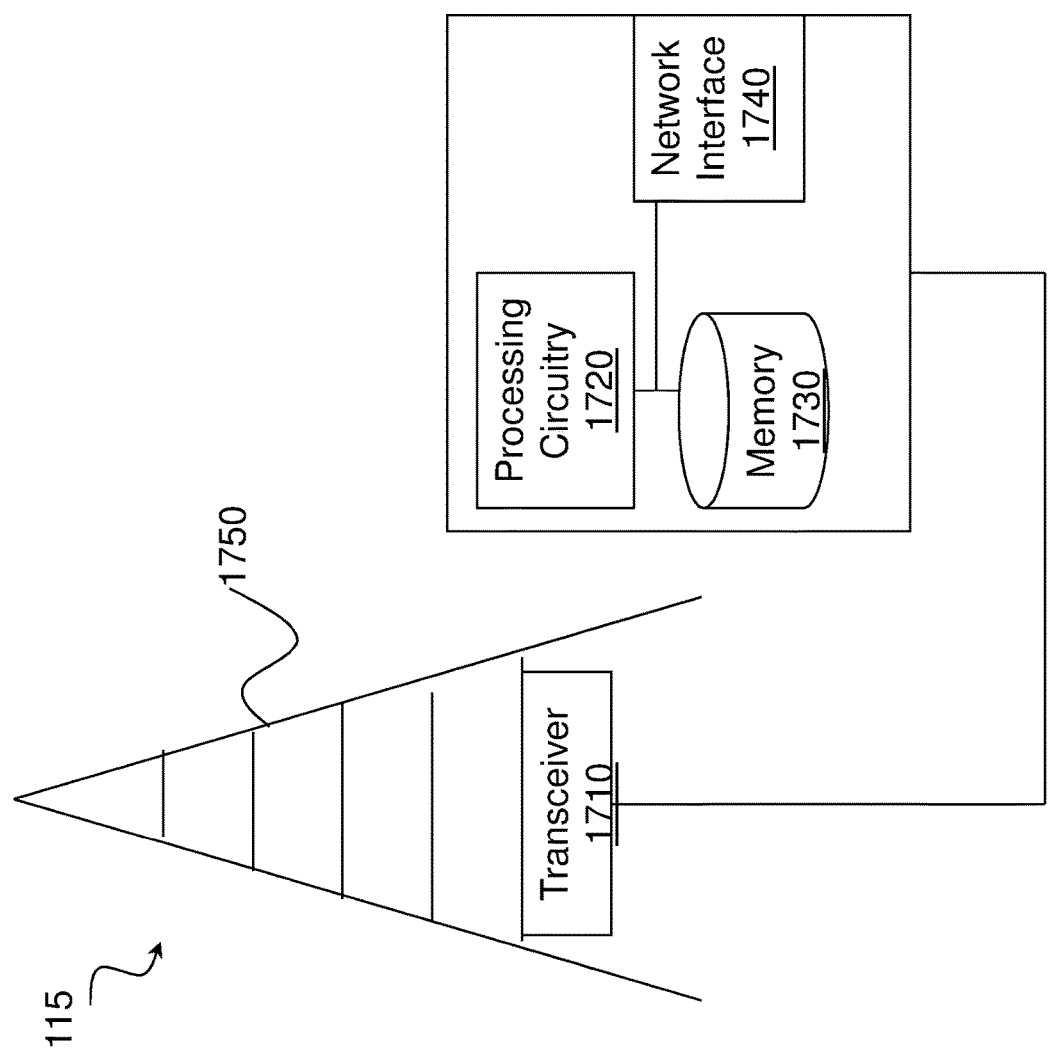
FIG. 17 is a block schematic of an exemplary network node, in accordance with certain embodiments.

FIG. 17 is a block schematic of an exemplary network node 815, in accordance with certain embodiments. Network node 815 may be any type of radio network node or any network node that communicates with a UE and/or with another network node. Examples of network node 815 include an eNB, a node B, a BS, a wireless AP (e.g., a Wi-Fi AP), a low power node, a BTS, relay, donor node controlling relay, transmission points, transmission nodes, RRU, RRH, MSR radio node such as MSR BS, nodes in DAS, O&M, OSS, SON, positioning node (e.g., E-SMLC), MDT, or any other suitable network node. Network nodes 815 may be deployed throughout a network as a homogenous deployment, heterogeneous deployment, or mixed deployment. A homogeneous deployment may generally describe a deployment made up of the same (or similar) type of network nodes 815 and/or similar coverage and cell sizes and inter-site distances. A heterogeneous deployment may generally describe deployments using a variety of types of network nodes 815 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 815 may include one or more of transceiver 1710, processing circuitry 1720, memory 1730, and network interface 1740. In some embodiments, transceiver 1710 facilitates transmitting wireless signals to and receiving wireless signals from wireless device 810 (e.g., via antenna 1750), processing circuitry 1720 executes instructions to provide some or all of the functionality described above as being provided by a network node 815, memory 1730 stores the instructions executed by processing circuitry 1720, and network interface 1740 communicates signals to backend network components, such as a gateway, switch, router, Internet, Public Switched Telephone Network (PSTN), core network nodes or radio network controllers 130, etc.

Processing circuitry 1720 may include any suitable combination of hardware and software implemented in one or more modules to execute instructions and manipulate data to perform some or all of the described functions of network node 815, such as those described above in relation to FIGS. 1-15. In some embodiments, processing circuitry 1720 may include, for example, one or more computers, one or more CPUs, one or more microprocessors, one or more applications, one or more ASICs, one or more FPGAs, and/or other logic.

Memory 1730 is generally operable to store instructions, such as a computer program, software, an application including one or more of logic, rules, algorithms, code, tables, etc. and/or other instructions capable of being executed by processing circuitry 1720. Examples of memory 1730 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1740 is communicatively coupled to processing circuitry 1720 and may refer to any suitable device operable to receive input for network node 815, send output from network node 815, perform suitable processing of the input or output or both, communicate to other devices, or any combination of the preceding. Network interface 1740 may include appropriate hardware (e.g., port, modem, network interface card, etc.) and software, including protocol conversion and data processing capabilities, to communicate through a network.

Other embodiments of network node 815 may include additional components beyond those shown in FIG. 17 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 18:
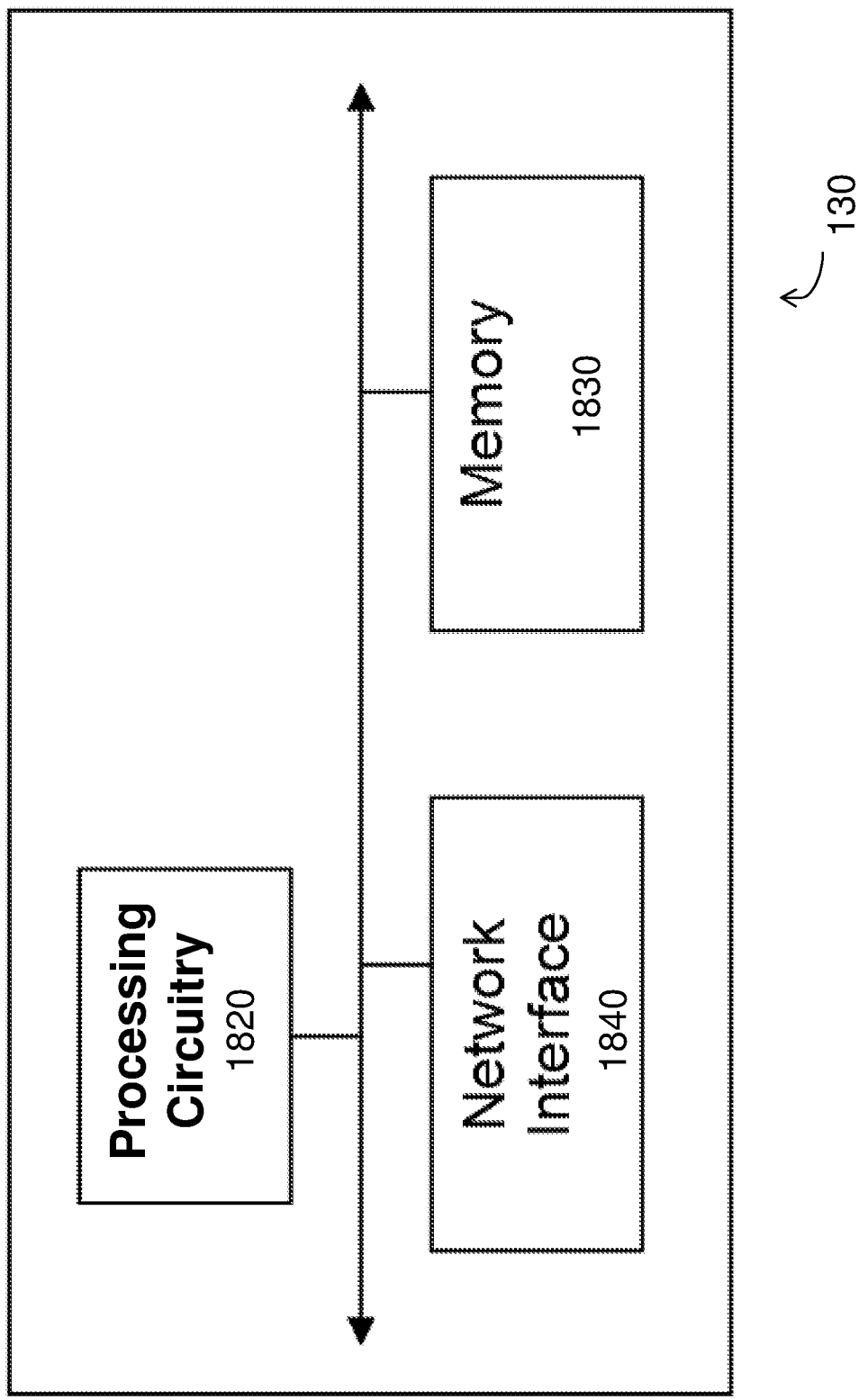
FIG. 18 is a block schematic of an exemplary radio network controller (RNC) or core network node, in accordance with certain embodiments.

FIG. 18 is a block schematic of an exemplary RNC or core network node 130, in accordance with certain embodiments. Examples of network nodes can include a MSC, a serving GPRS support node (SGSN), an MME, an RNC, a BSC, and so on. The RNC or core network node 130 includes processing circuitry 1820, memory 1830, and network interface 1840. In some embodiments, processing circuitry 1820 executes instructions to provide some or all of the functionality described above as being provided by the network node, memory 1830 stores the instructions executed by processing circuitry 1820, and network interface 1840 communicates signals to any suitable node, such as a gateway, switch, router, Internet, PSTN, network nodes 815, RNCs or core network nodes 130, etc.

Processing circuitry 1820 may include any suitable combination of hardware and software implemented in one or more modules to execute instructions and manipulate data to perform some or all of the described functions of the radio network controller or core network node 130. In some embodiments, processing circuitry 1820 may include, for example, one or more computers, one or more CPUs, one or more microprocessors, one or more applications, one or more ASICs, one or more FPGAs and/or other logic.

Memory 1830 is generally operable to store instructions, such as a computer program, software, an application including one or more of logic, rules, algorithms, code, tables, etc. and/or other instructions capable of being executed by processing circuitry 1820. Examples of memory 1830 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1840 is communicatively coupled to processing circuitry 1820 and may refer to any suitable device operable to receive input for the network node, send output from the network node, perform suitable processing of the input or output or both, communicate to other devices, or any combination of the preceding. Network interface 1840 may include appropriate hardware (e.g., port, modem, network interface card, etc.) and software, including protocol conversion and data processing capabilities, to communicate through a network.

Other embodiments of the network node may include additional components beyond those shown in FIG. 18 that may be responsible for providing certain aspects of the network node's functionality, including any of the functionality described above and/or any additional functionality (including any functionality necessary to support the solution described above).

Figure 19:
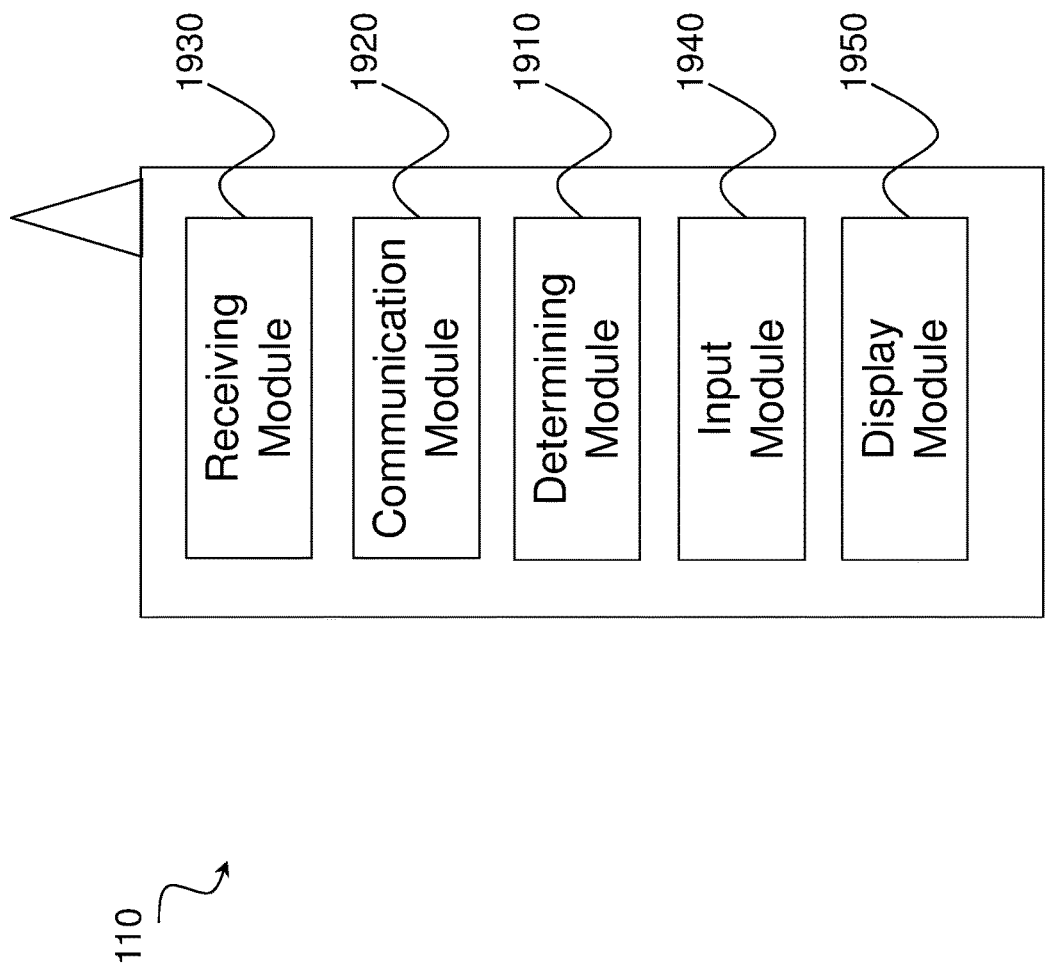
FIG. 19 is a block schematic of an exemplary wireless device, in accordance with certain embodiments.

FIG. 19 is a schematic block diagram of an exemplary wireless device, in accordance with certain embodiments. Wireless device 810 may include one or more modules. For example, wireless device 810 may include a determining module 1910, a communication module 1920, a receiving module 1930, an input module 1940, a display module 1950, and any other suitable modules. In some embodiments, one or more of determining module 1910, communication module 1920, receiving module 1930, input module 1940, display module 1950, or any other suitable module may be implemented using one or more processors, such as processing circuitry 1620 described above in relation to FIG. 16. In certain embodiments, the functions of two or more of the various modules may be combined into a single module. Wireless device 810 may perform the methods for ON/OFF mask selection described above with respect to FIGS. 1-15.

Determining module 1910 may perform the processing functions of wireless device 810. As one example, determining module 1910 may select an ON/OFF time mask to use for transmitting the one or more UL transmissions. As another example, determining module 1910 may determine, based on the received UL grant, an allowed placement of a transient period of the selected ON/OFF time mask and a duration of the transient period to use for the one or more UL transmissions. As still another example, determining module 1910 may extract information from the received uplink grant or scheduling information. As yet another example, determining module 1910 may determine a position of at least one of: a reference symbol of the at least one data UL transmission relative to the scheduled control channel transmission in time; a data symbol of the at least one data UL transmission relative to the scheduled control channel transmission in time; a reference symbol of the scheduled control channel transmission; and a data symbol of the scheduled control channel transmission.

Determining module 1910 may include or be included in one or more processors, such as processing circuitry 1620 described above in relation to FIG. 16. Determining module 1910 may include analog and/or digital circuitry configured to perform any of the functions of determining module 1910 and/or processing circuitry 1620 described above. The functions of determining module 1910 described above may, in certain embodiments, be performed in one or more distinct modules.

Communication module 1920 may perform the transmission functions of wireless device 810. As one example, communication module 1920 may perform the scheduled one or more UL transmissions using the selected ON/OFF time mask. Communication module 1920 may include a transmitter and/or a transceiver, such as transceiver 1610 described above in relation to FIG. 16. Communication module 1920 may include circuitry configured to wirelessly transmit messages and/or signals. In particular embodiments, communication module 1920 may receive messages and/or signals for transmission from determining module 1910. In certain embodiments, the functions of communication module 1920 described above may be performed in one or more distinct modules.

Receiving module 1930 may perform the receiving functions of wireless device 810. For example, receiving module 1930 may receive an UL grant from a network node, the uplink grant scheduling one or more uplink transmissions by the wireless device. Receiving module 1930 may include a receiver and/or a transceiver. Receiving module 1930 may include a receiver and/or a transceiver, such as transceiver 1610 described above in relation to FIG. 16. Receiving module 1930 may include circuitry configured to wirelessly receive messages and/or signals. In particular embodiments, receiving module 1930 may communicate received messages and/or signals to determining module 1910. The functions of receiving module 1930 described above may, in certain embodiments, be performed in one or more distinct modules.

Input module 1940 may receive user input intended for wireless device 810. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1910. The functions of input module 1940 described above may, in certain embodiments, be performed in one or more distinct modules.

Display module 1950 may present signals on a display of wireless device 810. Display module 1950 may include the display and/or any appropriate circuitry and hardware configured to present signals on the display. Display module 1950 may receive signals to present on the display from determining module 1910. The functions of display module 1950 described above may, in certain embodiments, be performed in one or more distinct modules.

Determining module 1910, communication module 1920, receiving module 1930, input module 1940, and display module 1950 may include any suitable configuration of hardware and/or software. Wireless device 810 may include additional modules beyond those shown in FIG. 19 that may be responsible for providing any suitable functionality, including any of the functionality described above and/or any additional functionality (including any functionality necessary to support the various solutions described herein).

Figure 20:
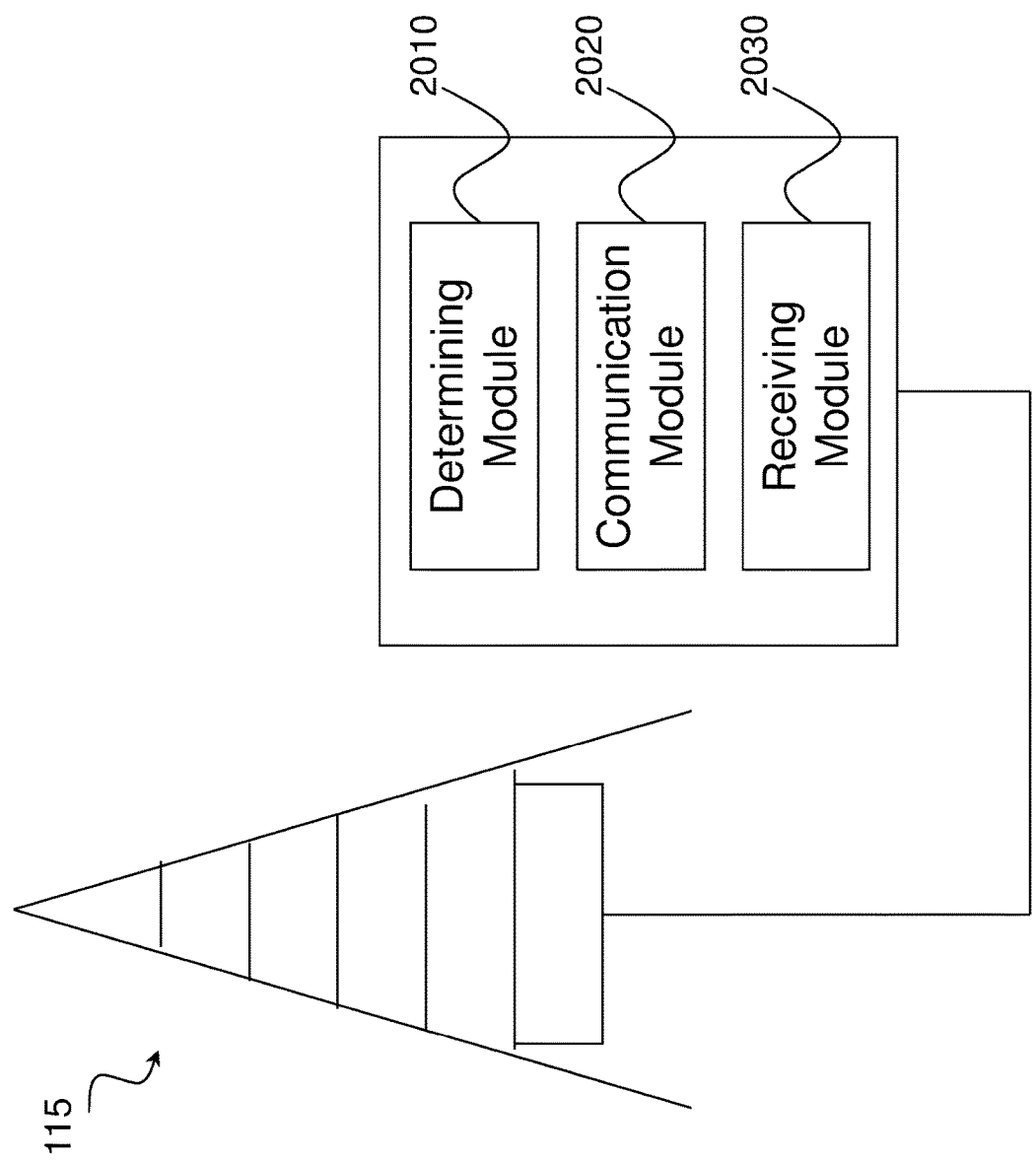
FIG. 20 is a block schematic of an exemplary network node, in accordance with certain embodiments.

FIG. 20 is a schematic block diagram of an exemplary network node 815, in accordance with certain embodiments. Network node 815 may include one or more modules. For example, network node 815 may include determining module 2010, communication module 2020, receiving module 2030, and any other suitable modules. In some embodiments, one or more of determining module 2010, communication module 2020, receiving module 2030, or any other suitable module may be implemented using one or more processors, such as processing circuitry 1720 described above in relation to FIG. 17. In certain embodiments, the functions of two or more of the various modules may be combined into a single module. Network node 815 may perform the methods for scheduling based on pre-defined ON/OFF masks described above with respect to FIGS. 1-15.

Determining module 2010 may perform the processing functions of network node 815. As one example, determining a position of a reference symbol in one or more UL transmissions to be scheduled for a wireless device. Determining module 2010 may include or be included in one or more processors, such as processing circuitry 1720 described above in relation to FIG. 17. Determining module 2010 may include analog and/or digital circuitry configured to perform any of the functions of determining module 2010 and/or processing circuitry 1720 described above. The functions of determining module 2010 may, in certain embodiments, be performed in one or more distinct modules.

Communication module 2020 may perform the transmission functions of network node 815. As one example, communication module 2020 may send an UL grant to the wireless device for scheduling the one or more UL transmissions, the UL grant indicating the determined position of the reference symbol in the one or more UL transmissions. Communication module 2020 may transmit messages to one or more of wireless devices 810. Communication module 2020 may include a transmitter and/or a transceiver, such as transceiver 1710 described above in relation to FIG. 17. Communication module 2020 may include circuitry configured to wirelessly transmit messages and/or signals. In particular embodiments, communication module 2020 may receive messages and/or signals for transmission from determining module 2010 or any other module. The functions of communication module 2020 may, in certain embodiments, be performed in one or more distinct modules.

Receiving module 2030 may perform the receiving functions of network node 815. Receiving module 2030 may receive any suitable information from a wireless device. Receiving module 2030 may include a receiver and/or a transceiver, such as transceiver 1710 described above in relation to FIG. 17. Receiving module 2030 may include circuitry configured to wirelessly receive messages and/or signals. In particular embodiments, receiving module 2030 may communicate received messages and/or signals to determining module 2010 or any other suitable module. The functions of receiving module 2030 may, in certain embodiments, be performed in one or more distinct modules.

Determining module 2010, communication module 2020, and receiving module 2030 may include any suitable configuration of hardware and/or software. Network node 815 may include additional modules beyond those shown in FIG. 20 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:

| | |
|---|---|
| 3GPP | Third Generation Partnership Project |
| ACK | Acknowledgement |
| AP | Access Point |
| ASIC | Application Specific Integrated Circuit |
| BLER | Block Error Rate |
| BS | Base Station |
| BSC | Base Station Controller |
| BTS | Base Transceiver Station |
| CA | Carrier Aggregation |
| CC | Component Carrier |
| CD | Compact Disk |
| CFI | Control Format Indicator |
| CPE | Customer Premises Equipment |
| CPU | Central Processing Unit |
| CRS | Common Reference Symbols |
| D2D | Device-to-device |
| DAS | Distributed Antenna System |
| DFT | Discrete Fourier Transform |
| DL | Downlink |
| DMRS | Demodulation Reference Signal |
| DVD | Digital Video Disk |
| eNB | evolved Node B |
| E-SMLC | Evolved-Serving Mobile Location Center |
| FPGA | Field Programmable Gate Array |
| FS | Frame Structure |
| gNB | gNodeB |
| GPRS | General Packet Radio Service |
| HARQ | Hybrid Automatic Repeat Request |
| HTTP | Hypertext Transfer Protocol |
| LAN | Local Area Network |
| LEE | Laptop Embedded Equipment |
| LME | Laptop Mounted Equipment |
| LTE | Long Term Evolution |
| M2M | Machine-to-Machine |
| MAN | Metropolitan Area Network |
| MCE | Multi-cell/multicast Coordination Entity |
| MCS | Modulation level and coding scheme |
| MDT | Minimization of Drive Test |
| MeNB | Master eNB |
| MME | Mobility Management Entity |
| MSC | Mobile Switching Center |
| MSR | Multi-Standard Radio |
| MTC | Machine-Type Communication |
| NACK | Negative Acknowledgement |
| NAS | Non-Access Stratum |
| NB-IoT | Narrowband Internet-of-Things |
| NR | New Radio |
| OFDM | Orthogonal Frequency Division Multiplexing |
| O&M | Operations & Management |
| OSS | Operations Support System |
| PCC | Primary Component Carrier |
| PCell | Primary Cell |
| PCFICH | Physical Control Format Indicator Channel |
| PDCCH | Physical Downlink Control Channel |
| PDSCH | Physical Downlink Shared Channel |
| PHICH | Physical HARQ Indication Channel |
| PRB | Physical Resource Block |
| PSCell | Primary Secondary Cell |
| PSTN | Public Switched Telephone Network |
| PUSCH | Physical Uplink Shared Channel |
| PUCCH | Physical Uplink Control Channel |
| RAM | Random Access Memory |
| RAN | Radio Access Network |
| RAT | Radio Access Technology |
| RB | Resource Block |
| RNC | Radio Network Controller |
| ROM | Read-Only Memory |
| RRC | Radio Resource Control |
| RRH | Remote Radio Head |
| RRM | Radio Resource Management |
| RRU | Remote Radio Unit |
| RSRP | Reference Signal Received Power |
| RSRQ | Reference Signal Received Quality |
| SCC | Secondary Component Carrier |
| SCell | Secondary Cell |
| SC-FDMA | Single-Carrier Frequency Division Multiple Access |
| SeNB | Secondary eNB |
| SGSN | Serving GPRS Support Node |
| SON | Self-Organizing Network |
| sPUCCH | Short Physical Uplink Control Channel |
| SRS | Sounding Reference Signal |
| SSF | Short Subframe |
| STA | Station |
| sTTI | Short Transmission Time Interval |
| TCP | Transmission Control Protocol |
| TDD | Time Division Duplex |
| TTI | Transmission Time Interval |
| UE | User Equipment |
| UL | Uplink |
| WAN | Wide Area Network |

The invention claimed is:

1. A method in a wireless device, comprising:
receiving an uplink grant from a network node, the uplink grant scheduling one or more uplink transmissions by the wireless device, the one or more uplink transmissions comprising a reference symbol, wherein a position of the reference symbol in the one or more uplink transmissions is flexible, and the uplink grant includes an indication of the position of the reference symbol in the one or more uplink transmissions;
determining, based on the received uplink grant, an allowed placement of a transient period of an ON/OFF time mask and a duration of the transient period to use for the one or more uplink transmissions, wherein determining the allowed placement and the duration of the transient period is further based on:
the position of the reference symbol in the one or more uplink transmissions; and
one or more consecutively scheduled uplink transmissions using short transmission time intervals (sTTIs); and
selecting an ON/OFF time mask to use for transmitting the one or more uplink transmissions based on the determined allowed placement of the transient period.

2. A wireless device, comprising:
a receiver;
a transmitter; and
processing circuitry coupled to the receiver and the transmitter, the processing circuitry configured to:
receive, via the receiver, an uplink grant from a network node, the uplink grant scheduling one or more uplink transmissions by the wireless device, the one or more uplink transmissions comprising a reference symbol, wherein a position of the reference symbol in the one or more uplink transmissions is flexible, and the uplink grant includes an indication of the position of the reference symbol in the one or more uplink transmissions;
determine, based on the received uplink grant, an allowed placement of a transient period of an ON/OFF time mask and a duration of the transient period to use for the one or more uplink transmissions, wherein the processing circuitry is configured to determine the allowed placement and the duration of the transient period further based on:

the position of the reference symbol in the one or more uplink transmissions; and
one or more consecutively scheduled uplink transmissions using short transmission time intervals (sTTIs); and
select an ON/OFF time mask to use for transmitting the one or more uplink transmissions based on the determined allowed placement of the transient period.

3. The wireless device of claim 2, wherein the processing circuitry is further configured to:
perform, via the transmitter, the scheduled one or more uplink transmissions using the selected ON/OFF time mask.

4. The wireless device of claim 2, wherein the processing circuitry is configured to determine the allowed placement and the duration of the transient period further based on one or more of:
one or more pre-defined rules;
a modulation to be used for the one or more uplink transmissions;
a coding rate to be used for the one or more uplink transmissions;
a modulation and coding scheme to be used for the one or more uplink transmissions;
a power level of one or more sTTIs;
a power level of one or more symbols; and
whether the one or more uplink transmissions share reference symbols.

5. The wireless device of claim 2, wherein a transient period of the selected ON/OFF time mask overlaps with one or more of:
a reference symbol of at least one of the scheduled one or more uplink transmissions; and
a data symbol of at least one of the scheduled one or more uplink transmissions.

6. The wireless device of claim 2 wherein:
the scheduled one or more uplink transmissions comprise at least one uplink transmission preceding or following a scheduled sounding reference signal (SRS) transmission; and
a transient period of the selected ON/OFF time mask does not overlap with the scheduled SRS transmission.

7. The wireless device of claim 2, wherein:
the scheduled one or more uplink transmissions comprise at least one data uplink transmission preceding or following a scheduled control channel transmission; and
the processing circuitry is configured to determine a position of at least one of:
a reference symbol of the at least one data uplink transmission relative to the scheduled control channel transmission in time;
a data symbol of the at least one data uplink transmission relative to the scheduled control channel transmission in time;
a reference symbol of the scheduled control channel transmission; and
a data symbol of the scheduled control channel transmission.

8. The wireless device of claim 7, wherein a transient period of the selected ON/OFF time mask overlaps with the reference symbol of the at least one data uplink transmission if the reference symbol is next to the scheduled control channel transmission in time.

9. The wireless device of claim 7, wherein a transient period of the selected ON/OFF time mask overlaps with both the data symbol of the at least one data uplink transmission and the scheduled control channel transmission if the data symbol of the at least data uplink transmission is next to the scheduled control channel transmission in time.

10. The wireless device of claim 7, wherein a transient period of the selected ON/OFF time mask overlaps with both the reference symbol of the at least one data uplink transmission and the reference symbol of the scheduled control channel transmission if both reference symbols are placed consecutively.

11. The wireless device of claim 7, wherein a transient period of the selected ON/OFF time mask overlaps both the data symbol of the at least one data uplink transmission and the data symbol of the scheduled control channel transmission if both the reference symbol of the at least one data uplink transmission and the reference symbol of the scheduled control channel transmission are placed consecutively.

12. The wireless device of claim 2, wherein:
the scheduled one or more uplink transmissions comprise two or more uplink transmissions; and
a transient period of the selected ON/OFF time mask overlaps with a reference symbol of at least one of the two or more uplink transmissions if the two or more uplink transmissions have separate reference symbol positions.

13. The wireless device of claim 2, wherein:
the scheduled one or more uplink transmissions comprise two or more uplink transmissions; and
a transient period of the selected ON/OFF time mask overlaps with a data symbol of at least one of the two or more uplink transmissions if the two or more uplink transmissions share reference symbol positions.

14. The wireless device of claim 2, wherein:
the scheduled one or more uplink transmissions comprise two or more uplink transmissions; and
a transient period of the selected ON/OFF time mask overlaps with a reference symbol of a first uplink transmission of the two or more uplink transmissions and a data symbol of a second uplink transmission of the two or more uplink transmissions.

15. The wireless device of claim 2, wherein selecting the ON/OFF time mask to use for transmitting the one or more uplink transmissions comprises selecting an ON/OFF time mask in which the transient period does not overlap with any symbols of the scheduled one or more uplink transmissions.

16. The wireless device of claim 2, wherein the one or more uplink transmissions are scheduled using short transmission time intervals.

* * * * *

UNITED STATES PATENT AND TRADEMARK OFFICE
CERTIFICATE OF CORRECTION

PATENT NO. : 11,553,513 B2
APPLICATION NO. : 16/482808
DATED : January 10, 2023
INVENTOR(S) : Falconetti et al.

It is certified that error appears in the above-identified patent and that said Letters Patent is hereby corrected as shown below:

On the Title Page

On Page 2, in Item (56), under "OTHER PUBLICATIONS", in Column 1, Line 7, delete "sill" and insert -- sTTI --, therefor.

In the Drawings

Figure 4:
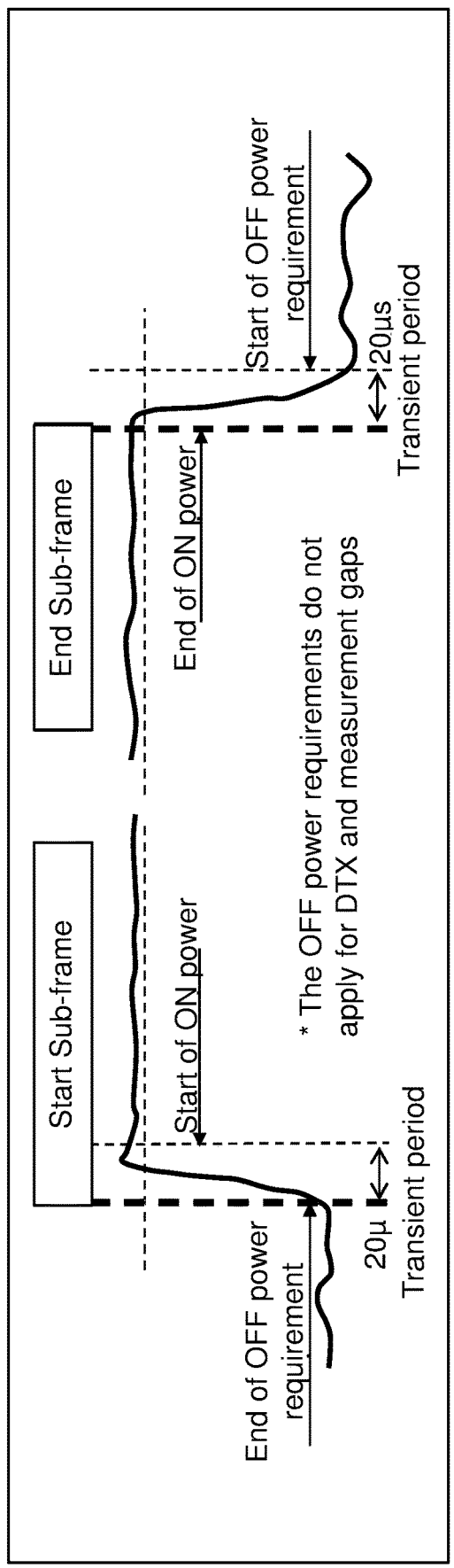
FIG. 4 illustrates an example of the general ON/OFF time mask.
Figure 5:
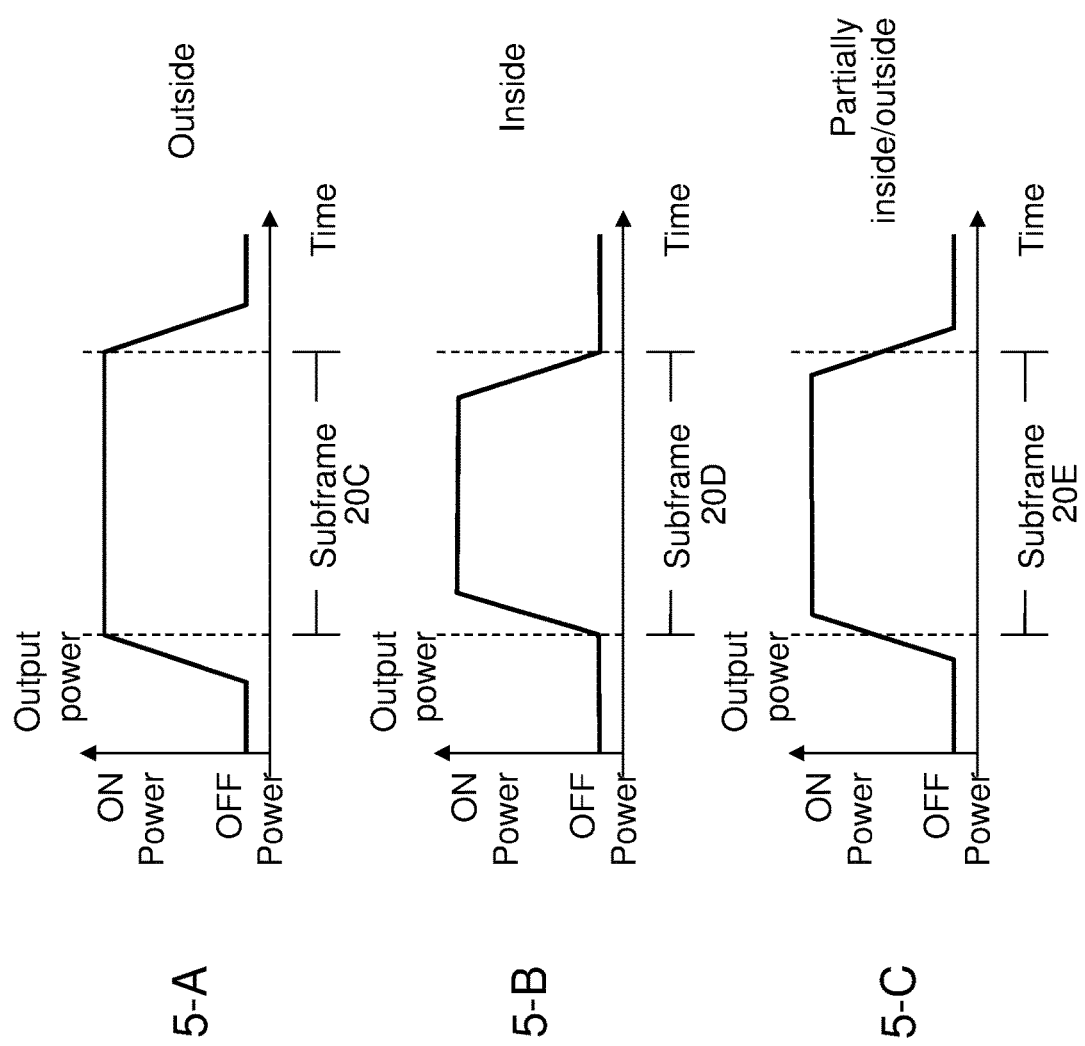
FIG. 5 illustrates examples of the different possibilities for location of the power ramps.

In Fig. 4, Sheet 4 of 20, delete "20µ" and insert -- 20 µs --, therefor.

In the Specification

In Column 1, Line 12, delete "Apparatus" and insert -- Apparatuses --, therefor.

In Column 1, Line 14, delete "far" and insert -- for --, therefor.

In Column 4, Line 53, delete "40 us." and insert -- 40 µs. --, therefor.

In Column 6, Line 29, delete "least" and insert -- least one --, therefor.

In Column 13, Line 67, delete "equipped" and insert -- equipment --, therefor.

In Column 21, Line 57, delete "least" and insert -- least one --, therefor.

In Column 24, Line 3, delete "and/or or" and insert -- and/or --, therefor.

In Column 25, Line 12, delete "and/or or" and insert -- and/or --, therefor.

In Column 25, Line 67, delete "and/or or" and insert -- and/or --, therefor.

In Column 29, Line 40, delete "Modulation level" and insert -- Modulation --, therefor.

Signed and Sealed this
Eleventh Day of July, 2023

Katherine Kelly Vidal
*Director of the United States Patent and Trademark Office*

In the Claims

In Column 32, Line 12, in Claim 9, delete "least" and insert -- least one --, therefor.